Patented Sept. 16, 1952

2,610,955

UNITED STATES PATENT OFFICE 2,610,955

DERIVATIVES OF CERTAIN OXYALKYLATED PHENOL-ALDEHYDE RESINS USEFUL IN COATING COMPOSITIONS

Melvin De Groote, University City, and Bernhard Keiser, Webster Groves, Mo., assignors to Petrolite Corporation, a corporation of Delaware No Drawing. Application August 2, 1948, Serial No. 42,138

19 Claims. (Cl. 260—19)

This invention relates to modified phenol-aldehyde resins which are valuable as constituents of coating compositions, such as varnishes, enamels, paints, inks, and the like, being used in such compositions in much the same way as the presently used oil-modified resin bases, and includes coating compositions containing them as film-forming constituents. The new compositions, when used in coating compositions, give coating films which are markedly resistant to weathering and which are otherwise durable, are relatively inert toward, and compatible with, pigments and fillers, are smooth, have high gloss, are resistant to water and alkali, and retain their hardness under conditions of high humidity. They include compositions which range in properties from compositions which have a relatively rapid drying rate to compositions which have a slower or a relatively slow drying rate, and show variations in properties similar to those observed in the short oil and the long oil alkyds.

The modified resins of the invention are obtained by the esterification of certain oxyalkylated phenol-aldehyde resins with the fatty acids of drying or semi-drying oils, and, advantageously, with a polybasic acid also. The phenol-aldehyde resins which are used as starting materials for the production of the new products are prepared from difunctional (direactive) phenols in which one of the reactive (o or p) positions of the phenol is substituted by a hydrocarbon radical having 4 to 18 carbon atoms, in the substantial absence of trifunctional phenols, and aldehydes having not over 8 carbon atoms. By "substantial absence of trifunctional phenols," we mean that such materials may be present only in amounts so small that they do not interfere with the formation of a solvent-soluble resin product. The actual amounts to be tolerated will, of course, vary with the nature of the other components of the system; but in general the proportion of trifunctional phenols which is tolerable in the conventional resinification procedures illustrated herein is quite small. In experiments following conventional procedure using an acid catalyst in which we have included trifunctional phenols in amounts of from 3% to about 1% or somewhat less, based on the difunctional phenols, we have encountered difficulties in preparing oxyalkylated derivatives of the type useful in the practice of this invention.

These phenol-aldhyde resins are oxyalkylated with an alpha-beta alkylene oxide having not more than 4 carbon atoms, selected from the class consisting of ethylene oxide, propylene oxide, butylene oxide, glycide and methylglycide, in such proportions that, on the average, for each hydroxyl group of the resin, less than two molecules and more than one-half molecule of alkylene oxide is used; with the proviso that at least a majority of the phenolic hydroxyl radicals present have their phenolic hydrogen replaced by the hydroxy alkylene group, so that, of the hydroxyl groups in the oxyalkylated product, at least 50% are alcoholic. Advantageously, at least one molecule of alkylene oxide is used and all of the hydroxyls of the oxyalkylated product are alcoholic.

To produce the new compositions the oxyalkylated resins are reacted with the fatty acids of drying or semi-drying oils and, advantageously, also with a polycarboxy acid (or, more commonly, the full equivalent of a polycarboxy acid—its anhydride). The total amount of acid or acids used must be stoichiometrically equal to at least one-half of the (phenolic, if any, plus alcoholic) hydroxyl groups of the oxyalkylated phenol-aldehyde resin; and the amount of acid may be increased to an amount approximately equivalent to the hydroxyl content of the oxyalkylated resin. The amount of fatty acids of drying or semi-drying oil may vary from about 20% to 100%, based stoichiometrically on the total (phenolic, if any, plus alcoholic) hydroxyl groups of the oxyalkylated resin; and the amount of the polybasic acid may vary from zero to about 70%, on the same basis, with the total of fatty acid and polybasic acid being from about 50%, on the same basis, to 100% based on the alcoholic hydroxyls, the phenolic hydroxyls being non-reactive.

The phenol-aldehyde resins which are used as starting materials for the preparation of the compositions of the invention are described in our applications, Serial No. 8,730, filed February 16, 1948, and Serial No. 8,731, filed February 16, 1948, both now abandoned. One type of these resins may be exemplified in an idealized simplification in the following formula:

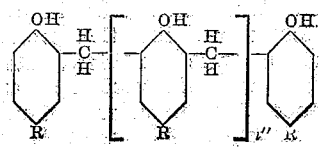

In this representation, $n'$ represents a numeral varying from 1 to 13 or even more, provided the resin is fusible and organic solvent-soluble, and R is a hydrocarbon radical having at least 4 and not over 18 carbon atoms. Such resins, when oxyalkylated with an alpha-beta alkylene oxide having not more than 4 carbon atoms, in proportions varying from about one-half mole of alkylene oxide for each hydroxyl equivalent of the resin, to something less than two moles, give oxyalkylated resins having reactive alcoholiform hydroxyl groups, some or substantially all of which are subsequently esterified with the fatty acids of drying or semi-drying oils and, advantageously, also with a polybasic acid, to give the new compositions of the invention, which are outstandingly useful as constituents of coating compositions.

In producing the parent phenol-aldehyde resins, any aldehyde capable of forming a methylol or a substituted methylol group and having not more than 8 carbon atoms is satisfactory, so long as it does not possess some other functional group or structure which will conflict with the resinification reaction or with the subsequent oxyalkylation of the resin, but the use of formaldehyde, in its cheapest form of an aqueous solution, for the production of the resins is particularly advantageous. Solid polymers of formaldehyde are more expensive and higher aldehydes are both less reactive, and are more expensive. Furthermore, the higher aldehydes may undergo other reactions which are not desirable, thus introducing difficulties into the resinification step. Thus acetaldehyde, for example, may undergo an aldol condensation, and it and most of the higher aldehydes enter into self-resinification when treated with strong acids or alkalis. On the other hand, higher aldehydes frequently beneficially affect the solubility and fusibility of a resin. This is illustrated, for example by the different characteristics of the resin prepared from paratertiary amyl phenol and formaldehyde on one hand and a comparable product prepared from the same phenolic reactant and heptaldehyde on the other hand. The former, as shown in certain subsequent examples, is a hard, brittle solid, whereas the latter is softer and more tacky, and obviously easier to handle in the subsequent oxyalkylation procedure.

Cyclic aldehydes may be employed, particularly benzaldehyde. The employment of furfural requires careful control for the reason that in addition to its aldehydic function, furfural can form condensations by virtue of its unsaturated structure. The production of resins from furfural for use in preparing products for the present process is most conveniently conducted with weak alkaline catalysts and often with alkali metal carbonates. Useful aldehydes, in addition to formaldehyde, are acetaldehyde, propionic aldehyde, butyraldehyde, 2-ethylhexanal, ethylbutyraldehyde, heptaldehyde, and benzaldehyde, furfural and glyoxal. It would appear that the use of glyoxal should be avoided due to the fact that it is tetrafunctional. However, our experience has been that, in resin manufacture and particularly as described herein, apparently only one of the aldehydic functions enters into the resinification reaction. The inability of the other aldehydic function to enter into the reaction is presumably due to steric hindrance. Resins produced with the use of furfural or glyoxal are, in our experience, dark in color and useful only for the production of final products to be used in black or dark-colored coating compositions. Needless to say, one can use a mixture of two or more aldehydes although usually this has no advantage.

Resins of the kind which are used in intermediates for the compounds used in the practice of this invention are obtained with the use of acid catalysts or alkaline catalysts, or without the use of any catalyst at all. Among the useful alkaline catalysts are ammonia, amines, and quaternary ammonium bases. It is generally accepted that when ammonia and amines are employed as catalysts they enter into the condensation reaction and, in fact, may operate by initial combination with the aldehydic reactant. The compound hexamethylenetetramine illustrates such a combination. In light of these various reactions it becomes difficult to present any formula which would depict the structure of the various resins prior to oxyalkylation. More will be said subsequently as to the difference between the use of an alkaline catalyst and an acid catalyst; even in the use of an alkaline catalyst there is considerable evidence to indicate that the products are not identical where different basic materials are employed. The basic materials employed include not only those previously enumerated but also the hydroxides of the alkali metals, hydroxides of the alkaline earth metals, salts of strong bases and weak acids such as sodium acetate, etc. Of the acids, oxalic acid appears to be the most useful. Hydrochloric acid tends to give dark products. Sulfuric acid is not usually useful, because it gives dark products and introduces sulfur, which is often objectionable in the final product.

Suitable phenolic reactants include the following; Para-tertiary-butylphenol; para-secondary-butylphenol; para - tertiary - amylphenol; para-secondary-amylphenol; para-tertiary-hexylphenol; para-isooctyl-phenol; ortho-phenylphenol; para-phenylphenol; ortho-benzylphenol; para-benzylphenol; and para-cyclohexylphenol; para-decyl-phenol; para-dodecyl-phenol; para-tetradecyl-phenol; para - octa - decyl - phenol; para-nonyl-phenol; para-menthyl-phenol; para-beta-naphthyl-phenol; para-alpha-naphthyl-phenol; para-pentadecyl-phenol; that of the formula

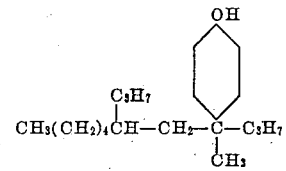

para- and ortho - cetyl - phenols; para - cumyl- phenol; phenols of the formula

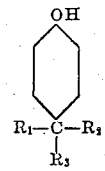

in which $R_1$ represents a straight chain hydrocarbon radical containing at least 7 carbon atoms and $R_2$ and $R_3$ represent hydrocarbon radicals the total number of carbon atoms attached to the tertiary carbon being at least 11 and not more than 17; and phenols of the formula

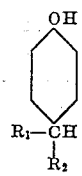

in which $R_1$ represents an alkyl hydrocarbon radical containing at least 7 carbon atoms in a straight chain and $R_2$ represents an alkyl hydrocarbon radical containing at least 2 carbon atoms, the total number of carbon atoms in R₁ and R₂ being at least 11 and not more than 17; and the corresponding ortho-para substituted meta-cresols and 3,5-xylenols.

The phenols herein contemplated for reaction may be indicated by the following formula:

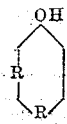

in which R is selected from the class consisting of hydrogen atoms and hydrocarbon radicals having at least 4 carbon atoms and not more than 18 carbon atoms, with the proviso that one occurrence of R is the hydrocarbon substituent and the other two occurrences are hydrogen atoms, and with the further provision that one or both of the 3 and 5 positions may be methyl substituted.

The above formula possibly can be restated more conveniently in the following manner, to wit, that the phenol employed is of the following formula, with the proviso that R is a hydrocarbon substituent located in the 2,4,6 position, again with the provision as to 3 or 3,5 methyl substitution. This is conventional nomenclature, numbering the various positions in the usual clockwise manner, beginning with the hydroxyl position as one:

The manufacture of thermoplastic phenol-aldehyde resins, particularly from formaldehyde and a difunctional phenol, i. e., a phenol in which one of the three reactive positions (2, 4, 6) has been substituted by a hydrocarbon group, and particularly by one having at least 4 carbon atoms and not more than 18 carbon atoms, is well known. As has been previously pointed out, there is no objection to a methyl radical provided it is present in the 3 or 5 position.

The manufacture of thermoplastic or fusible phenol-aldehyde resins useful as intermediates for the preparation of products of the invention is known. We refer to our Patent 2,499,370 for a description of the preparation of resins of this type and of the factors which require consideration in the selection of suitable resins, e. g., absence of trifunctional phenols in proportion sufficient to cause insolubilization, and the like. That patent also contains a description of a procedure (column 12, line 9, et seq.) which we use for determining the suitability of a phenol for preparing the products of the invention. We prefer, in examining phenols for producing products of the present invention to use a slightly modified test, by preparing a resin from the phenol and formaldehyde in excess (1.2 moles of formaldehyde per mole of phenol) and using an oxalic acid catalyst, in the manner described hereinafter in Example 1a. If the resin so obtained is solvent-soluble in any one of the aromatic or other solvents previously referred to, it is then subjected to oxyethylation. During oxyethylation a temperature is employed of approximately 150° to 165° C., with addition of at least ½ and less than 2 moles of ethylene oxide per phenolic hydroxyl. The oxyethylation is advantageously conducted so as to require from a few minutes up to 5 to 10 hours. If the product so obtained is solvent-soluble, the phenol is satisfactory from the standpoint of trifunctional phenol content. When a product becomes rubbery during oxyalkylation due to the presence of a small amount of trireactive phenol, it may become extremely insoluble, and no longer qualifies as being useful. Increasing the size of the aldehydic nucleus, for instance using heptaldehyde instead of formaldehyde, increases tolerance for trifunctional phenol.

Conversion of the oxyalkylated resins to the new compositions of the invention involves their esterification with the selected proportion of the fatty acids of drying or semi-drying oils and with a polybasic acid, in any. The fatty acids which may be used for this purpose include those of the common drying oils, including linseed oil, tung oil, dehydrated castor oil, perilla oil, oiticica oil, and the semi-drying oils, including soybean oil, rapeseed oil, fish oils, and the like. Useful polybasic acids (often used as anhydrides) include phthalic anhydride, succinic anhydride, Clocker adducts of crotonic anhydride such as the adduct of crotonic anhydride and an unsaturated fatty acid, Diels-Alder adducts such as the maleic acid-terpene- and maleic acid-pentadiene adducts, dimerized fatty acids, adipic acid, diglycollic acid, and the like. The reaction of the oxyalkylated resin with the acid or mixture of acids is an esterification, carried out in accordance with customary procedure by heating to temperature ranging from 200° to 250° C. for 4 to 24 hours. Heating to temperatures much higher than this may produce darkening of the product. The esterification should be carried out to substantial completeness, to give a product with a minimum acid number, i. e., a maximum of about 10, and, advantageously, considerably less.

Where polybasic acids are used along with fatty acids of drying or semi-drying oils, further polymerization appears to take place. As previously stated, the proportion of fatty acids used is from 20% to 100%, based on the total hydroxyls of the oxyalkylated resin, and the amount of polybasic acid ranges from zero to about 70% on the same basis, with the requirement that the total amount of acid be stoichiometrically equivalent to at least 50% of the hydroxyl groups of the oxyalkylated resin.

The preparation of the new products of the invention will be illustrated by the following specific examples, but the invention is not limited thereto. For convenience, the examples have been divided into three groups: Examples 1a to 118a some of which are examples of Patent 2,499,370 incorporated herein by reference, illustrating the preparation of suitable parent resins; Examples 1b to 5b, and the table, the preparation of suitable oxyalkylated derivatives thereof; and Examples 1c to 38c, the preparation of suitable esterified derivatives, which are compositions of the invention, and their compounding to form coating compositions.

In the production of the new compositions of the invention, including the preparation of the parent resin, the oxyalkylated resin, and the esterified final product, due precautions should be taken to avoid darkening. Thus, for the production of light-colored products, all reactions should be carried out in equipment which does not tend to cause darkening, such as glass, enamel-lined, stainless steel, or other suitable equipment, with suitable precautions to exclude oxygen, for example, by blanketing the reaction mixtures with an inert gas, such as carbon dioxide, or nitrogen, or solvent vapor. Such precautions are those commonly used in the preparation of varnishes and products of that nature. Of course, for certain uses it is unnecessary that the compositions have a light color, as, for example, where it is intended to produce a black or dark-colored final coating composition, and in such cases the precautions to obtain a light-colored product need not be used.

The properties of the final products vary from those characteristic of the short oil type, that is, with relatively rapid drying rates, to those characteristic of the long oil type, that is, with relatively slow drying rates. In general, the use of smaller proportions of the fatty acids of drying or semi-drying oils, and of larger proportions of polybasic acids tends to give products of the short oil type, while the use of small quantities or no polybasic acid and of relatively large proportions of the fatty acids, tends to give products of the long oil type. In general, the difference between the two is reflected, not only in differences in drying rates, but also in differences in other properties. Thus, the short oil type tends to give hard films which in some cases may verge on brittleness, while the long oil type tends to give softer but more flexible and tougher films. The variation in properties between the two extremes is gradual, and compositions of the invention, with properties varying all the way from those characteristic of the short oil type to the characteristic of the long oil type, may be prepared by appropriate variation in the proportions and amounts of the polybasic acid and the fatty acid. In general, decrease in the quantity of polybasic acid and increase in the quantity of fatty acid is reflected in an increase in drying time, a decrease in hardness, and an increase in flexibility and toughness of the films finally produced. The short oil type is particularly adapted for the production of coating compositions which are to be used for baked finishes. General characteristics of all of the compositions of the invention are their remarkable resistance to weathering and to alkali, and their compatibility with pigments.

Example 1a

| | Grams |
|---|---|
| Tertiary butyl phenol (7 moles) | 1050 |
| Formaldehyde (37½%)—(6.5 moles) | 525 |
| Oxalic acid | 5 |
| Wetting agent (Aerosol O. T.) 100% | 2 |

Place all the materials in a 5-liter three-necked glass flask fitted with an efficient glass stirrer, thermometer, and reflux condenser. Agitate continuously. Heat to 185° to 190° F. in 30 minutes. At this point an exothermic reaction may raise the temperature. Heat to 205° to 210° F. and hold for appearance of a thick, creamy mass, which will take place in about 45 minutes. Set the apparatus for distillation, and heat to 300° F. At about 260° to 275° F. an exothermic reaction will be observed. Hold the temperature at 290° to 300° F. until the resin has a melting point of about 235° F. on Parr melting point bar (Parr Instrument Co., Moline, Illinois). The yield of pale resin is 1100 to 1115 grams. The ball and ring melting point is about 275° F.

Example 2a

| | Grams |
|---|---|
| Tertiary butyl phenol | 1050 |
| Hydrochloric acid (32%) | 4 |
| Formaldehyde (37½%) | 525 |
| Aerosol O. T. (100%) | 2 |

The procedure followed is that of Example 1a. After 10 minutes at 300° F. the resin has a melting point of 284° F. (ball and ring). Yield 1108 parts. The reaction is fast.

Example 3a

| | Grams |
|---|---|
| Crude octyl phenol (73–76% octyl phenol content)[1] | 1670 |
| Oxalic acid | 8 |
| Formaldehyde (37½%) | 450 |
| Aerosol O. T. (sulfated dialkyl succinate) | 2 |

[1] Contains traces of phenol, mineral spirits B. P. 90° to 135° C. and water.

The procedure of Example 1a is varied as follows: Heat to 184° F. Attain 200° F. in 30 minutes and hold for 1½ to 2 hours. Distill to attain 280° F. in about 1½ hours. Distill slowly to attain 300° to 310° F. Hold until bar melting point is about 160° to 154° F. to attain ball and ring melting point of 190° to 205° F. Yield is 1400 parts.

Example 4a 100 parts of para-hydroxydiphenyl and 100 parts of commercial formaldehyde, with 0.7 gram oxalic acid as a condensing agent, are heated in a closed container under pressure to a temperature of about 120° C. until the condensation is substantially complete. The water is then removed by heating at reduced pressure. The product obtained by this procedure is a hard, clear, light-colored resinous material, melting at about 150° C. or higher and is readily soluble in tung oil and other fatty oils.

Ortho-hydroxydiphenyl can be substituted for the para-hydroxydiphenyl to yield a hard, clear, light-amber-colored material which melts at about 80° C., or the two can be mixed in varying proportions to give resinous products having any desired melting point ranging from about 80° to about 150° C.

Example 5a 100 parts of para-hydroxy-diphenyl, 100 parts acetaldehyde and 1 part commercial hydrochloric acid are refluxed together. The mass is dehydrated to yield an oil-soluble product.

Example 6a 147 parts of purified para-tertiary butyl phenol and 118 parts of 37.5% formaldehyde solution are reacted in the presence of 4 parts of oxalic acid for about 70 minutes at about 92–94° C. The mass is dehydrated to a boiling temperature in the resin of about 165° C., yielding a white-white resin.

Example 7a 100 parts of para-methyl-cyclo-hexyl phenol and 48.4 parts of formaldehyde are refluxed together in the persence of 1.93 parts of oxalic acid for about 7 hours and dehydrated to a temperature of 120° C. A water-white non-heat-hardening resin is obtained melting at about 287° C.

Example 8a 100 parts of octyl phenol is refluxed with 43.2 parts of formaldehyde and 1.73 parts of oxalic acid. The resin separates in about 12 hours, and it is dehydrated to 165° C. The resin obtained is soft, and, upon heating to 210° C., becomes brittle and about water-white in color; it melts at about 163° F.

Example 9a 100 parts of para-benzyl phenol is refluxed 8 hours with 48.4 parts of formaldehyde and 1.93 parts of oxalic acid. A brittle solid resin with a melting point of about 142° F. is obtained.

*Example 10a*

Charge 1148 grams of p-tertiary amylphenol, 525 grams of 37.2% formalin, 5 grams of oxalic acid, and 2 grams of Aerosol O. T. into a three-necked glass flask equipped with the thermometer, mechanical glass stirrer and reflux condenser. Reflux the mixture with stirring for 1.5 hours at 93–97° C.; then dehydrate by distillation at 110–150° C. for 4.3 hours. About 454 grams of water are removed. The yield of hard, brittle, reddish-yellow resin in one case was 1218 grams. Its melting point was 116–123° C.

*Example 11a*

|  | Pounds |
|---|---|
| Para-tertiary butylphenol | 36.0 |
| Formaldehyde 36.9% | 18.1 |
| Xylene | 38.9 |
| Oxalic acid | 0.2 |
| Dioctyl ester of sodium sulfosuccinic acid | 0.06 |

All of the phenol, formaldehyde, oxalic acid, and wetting agent, with 14.4 lbs. of the xylene were placed in a 15 gallon conventional stainless steel resin kettle. The mixture was refluxed at 92° C. for 80 minutes. 14.4 pounds of xylene were added, and the material dehydrated by distillation at 92°–149° C. for 2.75 hours. The resin was cooled, and a stream of nitrogen gas introduced concurrently. The remainder of the xylene was added. The product, 76.25 lbs. of pale tan slurry, contained 49.7% of solid resin, of melting point 124–132° C., on a copper block. A total of 15.25 lbs. of water was removed.

*Example 12a*

|  | Grams |
|---|---|
| Para-tertiary butylphenol (1.0 mole) | 150 |
| Formaldehyde 37% (1.0 mole) | 81 |
| Oxalic acid | 0.7 |
| Monoalkyl ($C_{10}$–$C_{20}$, principally $C_{12}$–$C_{14}$) benzene monosulfonic acid sodium salt | 0.8 |
| Xylene | 100 |

(Examples of alkylaryl sulfonic acids which serve as catalysts and as emulsifiers particularly in the form of sodium salts include the following:

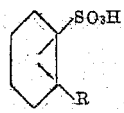

(R is an alkyl hydrocarbon radical having 12–14 carbon atoms.

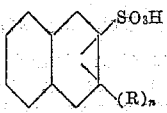

(R is an alkyl radical having 3–12 carbon atoms and n represents the numeral 3, 2, or 1, usually 2, in such instances where R contains less than 8 carbon atoms.

(With respect to alkylaryl sulfonic acids or the sodium salts, we have employed a monoalkylated benzene monosulfonic acid or the sodium salt thereof wherein the alkyl group contains 10 to 14 carbon atoms. We have found equally effective and interchangeable the following specific sulfonic acids or their sodium salts: A mixture of di- and tripropylated naphthalene monosulfonic acid; diamylated naphthalene monosulfonic acid; and nonyl naphthalene monosulfonic acid.)

The procedure followed was that of Example 1a. The phenol was a flaked solid.

The resin obtained in the operation above described was clear, light colored, hard, brittle, and had a melting point of 160–165° C.

*Example 13a*

The same procedure was followed as in the preceding example, and the materials used the same, except that the para-tertiary butylphenol was replaced by an equal amount of para-secondary butylphenol. The phenol was a solid of a somewhat mushy appearance, resembling moist cornmeal rather than dry flakes. The appearance of the resin was substantially identical with that of the preceding example.

*Example 14a*

|  | Grams |
|---|---|
| Para-tertiary amylphenol (1.0 mole) | 164 |
| Formaldehyde 37% (1.0 mole) | 81 |
| Oxalic acid | 0.7 |
| Monoalkyl ($C_{10}$–$C_{20}$, principally $C_{12}$–$C_{14}$) benzene monosulfonic acid sodium salt | 0.8 |
| Xylene | 100 |

The procedure followed was the same as that used in Example 1a, preceding. The phenol employed was a flaked solid. The solvent-free resin was light in color, hard, brittle, with a melting point of 128–140° C. It was xylene-soluble.

*Example 15a*

The phenol employed (164 grams) was para-secondary amylphenol, which is a liquid, the other ingredients being the same as in the preceding example. The procedure followed was the same as that used in Example 1a, preceding. The solvent-free resin was hard and brittle, light in color and with a melting point of 80–85° C.

*Example 16a*

The phenol employed (164 grams) was a commercially available mixed amylphenol containing approximately 95 parts of para-tertiary amylphenol, and 5 parts of ortho-tertiary amylphenol. It was in the form of a fused solid. The other ingredients and the procedure employed were the same as those of Example 12a preceding. The appearance of the resin was substantially the same as that of the product of Example 14a.

Sometimes resins produced from para-tertiary amylphenol and formaldehyde in the presence of an acid catalyst show a slight insolubility in xylene; that is, while completely soluble in hot xylene to give a clear solution, they give a turbid solution in cold xylene. Such turbidity or lack of solubility disappears on heating, or on the addition of diethylethyleneglycol.

We have never noticed this characteristic properly when using the commercial phenol of Example 16a which, as stated, is a mixture containing 95% para-tertiary amylphenol and 5% ortho-tertiary amylphenol. In fact, the addition of 5% to 8% of an ortho-substituted phenol, such as ortho-tertiary amylphenol, to any difunctional para-substituted phenol, such as the conventional para-substituted phenols herein mentioned, usually gives an increase in solubility when the resulting resin is high melting, which is often the case when formaldehyde and an acid catalyst are employed.

*Example 17a*

The phenol employed (164 grams) was ortho-tertiary amylphenol which is a liquid. The other ingredients and the procedure followed were the same as those used in Example 12a, and the appearance of the resin was light amber in color and transparent. It was soft to pliable in consistency and xylene-soluble.

*Example 18a*

The phenol employed (178 grams) was para-tertiary hexylphenol. This is a solid at ordinary temperatures. The other ingredients and the procedure followed were the same as those used in Example 12a preceding, and the appearance of the resin was substantially the same as that of the resin of Example 14a. The solvent-free resin is slightly opaque in appearance, light amber in color, semi-hard to pliable in consistency, and xylene-soluble.

*Example 19a*

The phenol employed was commercial para-octylphenol. 206 grams of this phenol were employed instead of 164 grams of an amylphenol or 150 grams of a butylphenol and 150 grams of xylene were used instead of 100. Otherwise, the procedure and other ingredients were the same as those used in Example 12a. The solvent-free resin obtained was light amber in color, soft to pliable in consistency, and xylene-soluble.

*Example 20a*

See Example 9a of Patent 2,499,370.

*Example 21a*

The same procedure was employed as in Example 12a, except that para-cyclohexylphenol, 176 grams, was employed along with 150 grams of xylene. This phenol was solid. The resulting resin minus solvents was opaque in appearance, xylene-dispersible, amber in color, hard and brittle, with an approximate melting point of 170° C. It was sufficiently curable to prohibit distillation.

*Example 22a*

The same procedure was employed as in Example 12a, preceding, but using 198 grams of commercial styrylphenol and 150 grams of xylene. Styrylphenol is a white solid. The resin was light in color, hard and brittle, with a melting point of about 80° to 85° C.

*Example 23a*

See Example 12a of Patent 2,499,370.

*Example 24a*

See Example 13a of Patent 2,499,370.

*Example 25a*

| | Grams |
|---|---|
| Para-tertiary butylphenol (1.0 mole) | 150 |
| Acetaldehyde (1.0 mole) | 44 |
| Oxalic acid | 2 |
| Xylene | 100 |

The phenol, acid catalyst, and 50 grams of the xylene were combined in the resin pot previously described. The initial mixture did not include the aldehyde. The mixture was heated with stirring to approximately 150° C. and permitted to reflux.

The remainder of the xylene, 50 grams, was then mixed with the acetaldehyde; and this mixture was added slowly to the materials in the resin pot, with constant stirring, by means of a separatory funnel. Approximately 30 minutes were required to add this amount of diluted aldehyde. A mild exothermic reaction was noted at the first addition of the aldehyde. The temperature slowly dropped, as water of reaction formed, to about 100° to 110° C., with a reflux temperature being determined by the boiling point of water. After all the aldehyde had been added, the reactants were permitted to reflux for between an hour and an hour and a half before removing the water by means of the trap arrangement. After the water was removed the remainder of the procedure was essentially the same as in Example 1a. When a sample of the resin was freed from the solvent, it was light in color, semi-hard or pliable in consistency, and xylene-soluble.

*Example 26a*

The same procedure was followed as in Example 25a, except that the para-tertiary butylphenol was replaced by an equal amount of para-secondary butylphenol. The appearance of the final resin on a solvent-free basis was substantially identical with the preceding example, except that it was somewhat more fluid in consistency and slightly tacky.

*Example 27a*

The same procedure was followed as in Example 25a, except that the 150 grams of para-tertiary butylphenol were replaced by 164 grams of para-tertiary amylphenol. The final solvent-free resin was clear and dark red in color. It was xylene-soluble and semi-hard or pliable in consistency.

*Example 28a*

The same procedure was followed as in Example 27a preceding, except that the para-tertiary amylphenol was replaced by an equal amount of para-secondary amylphenol. The appearance of the resin was substantially identical with that of the resin of the preceding example, except that it was somewhat more fluid in consistency and slightly tacky.

*Example 29a*

The same procedure was followed as in Example 27a, except that the amylphenol employed was the phenol described in Example 16a. The appearance of the resin on a solvent-free basis was substantially the same as that of Example 27a.

*Example 30a*

The same procedure was followed as in Example 27a, except that the amylphenol employed was ortho-tertiary amylphenol. The resin on a solvent-free basis was transparent and light-colored; it was soft to tacky in consistency and xylene-soluble.

*Example 31a*

The same procedure was followed as in Example 25a, except that the 150 grams of para-tertiary butylphenol were replaced by 206 grams of commercial para-octylphenol. The solvent-free resin was pale in color, soft to tacky in consistency, and xylene-soluble.

*Example 32a*

The same procedure was employed as in Example 25a, except that the 150 grams of para-tertiary butylphenol were replaced by 170 grams of para-phenylphenol. The resin produced was at least dispersible in xylene when hot, giving the appearance of solubility. When the solution cooled, obvious separation took place. For this reason 100 grams of diethyleneglycol diethylether were added to the finished resin mixture, when hot, so as to give a suitable solution when cold.

A small sample was taken before adding the diethyleneglycol diethylether, and the xylene was evaporated in order to determine the character of the resin. The solvent-free resin was light in color. It was soft and pliable in consistency.

Example 33a

The same procedure was followed as in Example 25a, except that 176 grams of para-cyclohexylphenol were employed instead of the para-tertiary butylphenol. The solvent-free resin was clear, light in appearance, soft to pliable in consistency, and xylene-soluble.

Example 34a

The same procedure was followed as in Example 25a, except that the phenol employed was commercial styrylphenol and the amount employed was 198 grams. The resin was soft-to-pliable, light in color, and xylene-soluble.

Example 35a

| | Grams |
|---|---|
| Para-tertiary amylphenol (1.0 mole) | 164 |
| Heptaldehyde (1.0 mole) | 114 |
| Oxalic acid | 2 |
| Xylene | 100 |

The procedure employed was essentially the same as in the Example 25a, where acetaldehyde was employed, but with the difference that due to the fact that the particular aldehyde was a higher-boiling aldehyde it was not necessary to dilute it with the xylene. For this reason all the xylene was added to the initial mixture, and the higher-boiling aldehyde was added by means of a separatory funnel. Thus, the phenol, acid catalyst, and solvent were combined in a resin pot by the same procedure used as in Example 25a. The resin, after removal of the solvent by distillation, was clear, amber in color, had a soft, tacky appearance and was xylene-soluble.

Example 36a

| | Grams |
|---|---|
| Para-secondary butylphenol (1.0 mole) | 150 |
| Heptaldehyde (1.0 mole) | 114 |
| Oxalic acid | 2 |
| Xylene | 100 |

The same procedure was employed as in Example 35a. The solvent-free resin had physical characteristics similar to those of the resin of Example 35a.

Example 37a

| | Grams |
|---|---|
| Para-tertiary butylphenol (1.0 mole) | 150 |
| Heptaldehyde (1.0 mole) | 114 |
| Oxalic acid | 2 |
| Xylene | 100 |

This resin was prepared as in Example 35a preceding, with the resulting solvent-free resin being of a clear amber color, semi-hard or pliable, and xylene-soluble.

Example 38a

| | Grams |
|---|---|
| Para-phenylphenol (1.0 mole) | 170 |
| Heptaldehyde (1.0 mole) | 114 |
| Oxalic acid | 2 |
| Xylene | 100 |

The resin was prepared as in Example 35a. The solvent-free resin was slightly opaque, soft to fluid, and sufficiently xylene-dispersible to permit subsequent oxyalkylation.

Example 39a

| | Grams |
|---|---|
| Para-cyclohexylphenol (3.0 moles) | 528 |
| Heptaldehyde (3.0 moles) | 342 |
| Oxalic acid | 6 |
| Xylene | 500 |

This resin, made as in Example 35a, in solvent-free form was clear, amber in color, semi-soft to pliable and xylene-soluble.

Example 40a

| | Grams |
|---|---|
| Para-tertiary amylphenol (1.0 mole) | 164 |
| Benzaldehyde (1.0 mole) | 106 |
| Oxalic acid | 2 |
| Xylene | 100 |

This resin, made as in Example 35a, in solvent-free form was clear, hard, brittle, had a melting point of 160–165° C., and was xylene-soluble.

Example 41a

| | Grams |
|---|---|
| Para-secondary butylphenol (1.0 mole) | 150 |
| Benzaldehyde (1.0 mole) | 106 |
| Oxalic acid | 2 |
| Xylene | 100 |

This resin, made following the procedure employed in Example 35a, in solvent-free form was clear, light in color, semi-hard or pliable and xylene-soluble.

Example 42a

| | Grams |
|---|---|
| Para-tertiary butylphenol (1.5 moles) | 225 |
| Benzaldehyde (1.5 moles) | 159 |
| Oxalic acid | 3 |
| Xylene | 200 |

The above reactants were combined by the procedure of Example 35a. The solvent-free resin was a clear, hard, brittle, light amber colored resin, which was xylene-soluble, and had a melting point of 180–185° C. It was to some degree heat-curable.

Example 43a

| | Grams |
|---|---|
| Para-phenylphenol (1.5 moles) | 255 |
| Benzaldehyde (1.5 moles) | 159 |
| Oxalic acid | 3 |
| Xylene | 200 |

This resin was made as in Example 35a. The resulting solvent-free resin was clear, light, hard, and brittle, with a melting point of 200–205° C. It was somewhat heat-curable, and almost completely soluble in xylene, with some insoluble material which was dispersible. It was suitable for subsequent oxyalkylation.

Example 44a

| | Grams |
|---|---|
| Para-cyclohexylphenol (3.0 moles) | 528 |
| Benzaldehyde (3.0 moles) | 318 |
| Oxalic acid | 6 |
| Xylene | 500 |

This resin, formed by combining the above reactants according to the procedure employed in Example 35a, was hard, brittle, xylene-soluble, light in color, and had a melting point of 165–170° C., with a tendency towards being heat curable.

Example 45a

| | Grams |
|---|---|
| Para-tertiary amylphenol (1.0 mole) | 164 |
| Propionaldehyde 96% (1.0 mole) | 60.5 |
| Oxalic acid | 2 |
| Xylene | 150 |

The above reactants were combined according to the procedure followed in Example 35a. The resulting solvent-free resin was clear, light amber in color, soft to pliable, and xylene-soluble.

Example 46a

| | Grams |
|---|---|
| Para-secondary butylphenol | 150 |
| Propionaldehyde 96% | 60.5 |
| Oxalic acid | 2 |
| Xylene | 100 |

This resin was prepared according to the procedure employed in Example 35a. The resulting solvent-free resin was clear, soft to fluid, light amber in color, and was xylene-soluble.

Example 47a

| | Grams |
|---|---|
| Para-tertiary butylphenol (1.0 mole) | 150 |
| Propionaldehyde 96% (1.0 mole) | 60.6 |
| Oxalic acid | 2 |
| Xylene | 100 |

This resin was prepared according to the procedure employed in Example 35a. The resulting solvent-free resin was clear, amber in color, xylene-soluble, hard and brittle, and has a melting point of 80–85° C.

Example 48a

| | Grams |
|---|---|
| Para-phenylphenol (3.0 moles) | 510 |
| Propionaldehyde, 96% (3.0 moles) | 182 |
| Oxalic acid | 6 |
| Xylene | 500 |

The resulting resin, prepared according to the procedure of Example 35a, when solvent-free, was opaque, hard, relatively dark, and xylene-insoluble, but sufficiently dispersible in xylene for subsequent oxyalkylation. Addition of a minor proportion of ethyleneglycol diethylether completely solubilized the resin in xylene, a clear solution resulting.

Example 49a

| | Grams |
|---|---|
| Para-cyclohexylphenol (3.0 moles) | 528 |
| Propionaldehyde 96% (3.0 moles) | 182 |
| Oxalic acid | 6 |
| Xylene | 500 |

The resulting resin, prepared according to directions in Example 35a, when solvent-free was clear, light in color, xylene-soluble, hard and brittle, and had a melting point of 84–90° C.

Example 50a

| | Grams |
|---|---|
| Para-tertiary amylphenol | 164 |
| 2-ethyl-3-propyl acrolein | 126 |
| Oxalic acid | 2 |
| Xylene | 100 |

The procedure employed was the same as for the use of heptaldehyde, as in Example 35a. The resulting solvent-free resin was amber in color, and soft to fluid in consistency. It was xylene-soluble.

Example 51a

| | Grams |
|---|---|
| Para-tertiary butylphenol | 150 |
| 2-ethyl-3-propyl acrolein | 126 |
| Oxalic acid | 2 |
| Xylene | 100 |

The procedure employed was the same as for the use of heptaldehyde, as in Example 35a. The appearance of the resin was the same as the resin of the Example 50a.

Example 52a

| | Grams |
|---|---|
| Commercial para-octylphenol | 206 |
| 2-ethyl-3-propyl acrolein | 126 |
| Oxalic acid | 2 |
| Xylene | 100 |

The procedure employed was the same as for the use of heptaldehyde, as in Example 35a. The appearance of the resin was the same as the resin of Example 50a.

Example 53a
See Example 42a of Patent 2,499,370.

Example 54a
See Example 43a of Patent 2,499,370.

Example 55a
See Example 44a of Patent 2,499,370.

Example 56a
See Example 45a of Patent 2,499,370.

Example 57a
See Example 46a of Patent 2,499,370.

Example 58a
See Example 47a of Patent 2,499,370.

Example 59a
See Example 48a of Patent 2,499,370.

Example 60a
See Example 49a of Patent 2,499,370.

Example 61a
See Example 50a of Patent 2,499,370.

Example 62a
See Example 51a of Patent 2,499,370.

Example 63a
See Example 52a of Patent 2,499,370.

Example 64a
See Example 53a of Patent 2,499,370.

Example 65a
See Example 54a of Patent 2,499,370.

Example 66a
See Example 55a of Patent 2,499,370.

Example 67a
See Example 56a of Patent 2,499,370.

Example 68a
See Example 57a of Patent 2,499,370.

Example 69a
See Example 58a of Patent 2,499,370.

Example 70a
See Example 59a of Patent 2,499,370.

Example 71a
See Example 60a of Patent 2,499,370.

Example 72a

This resin was obtained by the vacuum distillation of the resin of Example 14a. Vacuum distillation was conducted up to 250° C. at 25 mm. Hg. The resulting resin was hard, brittle, amber colored, and had a slightly higher melting point than the resin prior to vacuum distillation, to wit, 140–145° C. It was xylene-soluble. The molec-

Example 73a

This resin was obtained by the vacuum distillation of the resin of Example 19a. Vacuum distillation was conducted up to 225° C. at 25 mm. The resulting resin was xylene-soluble, hard, brittle, reddish in color, with a melting point of 140–145° C. Note that this resin, prior to vacuum distillation, was soft to pliable in consistency.

Example 74a

This resin was obtained by the vacuum distillation of the resin of Example 21a. Vacuum distillation was conducted up to 225° C. at 25 mm. The resulting resin was xylene-dispersible, soluble in a mixture of xylene and diethyleneglycol diethylether, brown in color, and hard and brittle in nature. It had a melting point of 180–185° C. This was moderately higher than the resin prior to vacuum distillation.

Example 75a

See Example 64a of Patent 2,499,370.

Example 76a

This resin was obtained by the vacuum distillation of the resin of Example 27a. Vacuum distillation was conducted up to 225° C. at 25 mm. The resulting resin had the same physical characteristics as the undistilled resin except that it was slightly more viscous.

Example 77a

This resin was obtained by the vacuum distillation of the resin of Example 26a. Vacuum distillation was conducted up to 225° C. at 25 mm. The resulting resin was semi-hard to pliable.

Example 78a

This resin was obtained by the vacuum distillation of the resin of Example 31a. Vacuum distillation was conducted up to 225° C. at 25 mm. The resulting resin was hard to pliable.

In the immediately preceding examples describing the production of resins by the vacuum distillation of resins of earlier examples, the vacuum used was approximately 25 mm. and the temperature was brought up to 225° C. Generally speaking, this is about the maximum temperature which is usable, and if the products obtained on distilling to this temperature, even if xylene-soluble, give insoluble or rubbery products on oxyethylation, the temperature used should be lower. We have found that using a temperature of 190° C. at 25 mm. gives very satisfactory compounds which have little tendency to form rubbery derivatives during oxyethylation.

Example 79a

See Example 68a of Patent 2,499,370.

Example 80a

| | Grams |
|---|---|
| Menthyl phenol, technically pure (0.1 mole) | 232 |
| Formaldehyde 37% (1.0 mole) | 81 |
| Oxalic acid | 0.7 |
| Monoalkyl ($C_{10}$–$C_{20}$, principally $C_{12}$–$C_{14}$) benzene monosulfonic acid sodium salt | 2 |
| Xylene | 200 |

The procedure followed was that of Example 1a. The resin obtained was clear, amber in color, hard, brittle and had a melting point of about 115–120° C.

Example 81a

| | Grams |
|---|---|
| Nonylphenol (para) 3.0 moles | 660 |
| Formaldehyde 37% (3.0 moles) | 243 |
| Oxalic acid | 3.2 |
| Monoalkyl ($C_{10}$–$C_{20}$, principally $C_{12}$–$C_{14}$) benzene monosulfonic acid sodium salt | 2.5 |
| Xylene | 300 |

The procedure followed was the same as that used in Example 1a. The phenol employed was a heavy, sirupy liquid, largely or almost entirely para with possibly a small percentage of ortho present. The solvent-free resin was clear, light in color and semi-soft or pliable in consistency.

Example 82a

| | Grams |
|---|---|
| Octadecylphenol (1.0 mole) | 346 |
| Formaldehyde 37% (1.0 mole) | 81 |
| Oxalic acid | 1.1 |
| Monoalkyl ($C_{10}$–$C_{20}$, principally $C_{12}$–$C_{14}$) benzene monosulfonic acid sodium salt | 1.6 |
| Xylene | 200 |

The procedure followed was the same as that used in Example 1a preceding. The phenol employed was a liquid. It was largely or entirely the para isomer with possibly a small amount of ortho present. The resulting solvent-free resin was soft to pliable in consistency, clear and light amber in color.

Example 83a

| | Grams |
|---|---|
| Crude para-cumylphenol (1.27 moles) | 268 |
| Formaldehyde 37% (2.0 moles) | 162 |
| Oxalic acid | 0.9 |
| Monoalkyl ($C_{10}$–$C_{20}$, principally $C_{12}$–$C_{14}$) benzene monosulfonic acid sodium salt | 1 |
| Xylene | 250 |

The so-called crude para-cumylphenol was a comparatively high grade product containing 90% to 95% of the phenol and the impurities present were hydrocarbons with less than ½% of phenol (hydroxy-benzene). The phenol was a yellowish colored solid, having a somewhat waxy appearance. The procedure followed was that of Example 1a. The resulting solvent-free resin was slightly opaque, amber in color and hard but not particularly brittle. It had a melting point of 80° to 85° C.

Example 84a

| | Grams |
|---|---|
| Para-decylphenol (1.0 mole) | 234 |
| Formaldehyde 37% (1.0 mole) | 81 |
| Oxalic acid | 0.7 |
| Monoalkyl ($C_{10}$–$C_{20}$, principally $C_{12}$–$C_{14}$) benzene monosulfonic acid sodium salt | 1.2 |
| Xylene | 200 |

The procedure followed was the same as that used in Example 1a preceding. The phenol was a straw colored liquid having a little phenolic odor. The solvent-free resin obtained was light in color and semi-soft or pliable in consistency.

Example 85a

| | Grams |
|---|---|
| Para-dodecylphenol (1.0 mole) | 262 |
| Formaldehyde 37% (1.0 mole) | 81 |
| Oxalic acid | 1.2 |
| Monoalkyl ($C_{10}$–$C_{20}$, principally $C_{12}$–$C_{14}$) benzene monosulfonic acid sodium salt | 2.5 |
| Xylene | 250 |

The procedure followed was the same as that used in Example 1a. The phenol was a straw colored liquid having a little phenolic odor. The solvent-free resin obtained was light in color and semi-soft or pliable in consistency.

*Example 86a*

See Example 74a of Patent 2,499,370.

*Example 87a*

| | Grams |
|---|---|
| Menthylphenol, technically pure (1.0 mole) | 232 |
| Acetaldehyde (1.0 mole) | 44 |
| Oxalic acid | 2 |
| Xylene | 100 |

The phenol, acid catalyst, and 50 grams of the xylene were combined in the reaction vessel. The initial mixture did not include the aldehyde. The mixture was heated with stirring to approximately 150° C. and permitted to reflux.

The remainder of the xylene, 50 grams, was then mixed with the acetaldehyde; and this mixture was added slowly to the materials in the resin pot, with constant stirring, by means of a separatory funnel. Approximately 30 minutes were required to add this amount of diluted aldehyde. A mild exothermic reaction was noted at the first addition of the aldehyde. The temperature slowly dropped, as water of reaction formed, to about 100° to 110° C., with the reflux temperature being determined by the boiling point of water. After all the aldehyde had been added, the reactants were permitted to reflux for between an hour to an hour and a half before removing the water by means of the trap arrangement. After the water was removed the remainder of the procedure was essentially the same as in Example 1a. The solvent-free resin was hard but not brittle, amber in color and had a melting point of about 50° to 55° C.

*Example 88a*

| | Grams |
|---|---|
| Nonylphenol, para (0.773 mole) | 170 |
| Acetaldehyde (0.773 mole) | 34 |
| Oxalic acid | 3 |
| Xylene | 75 |

The same procedure was followed as in Example 87a, except that nonylphenol was used instead of menthylphenol. The solvent-free resin was amber in color and soft to pliable in consistency.

*Example 89a*

| | Grams |
|---|---|
| Octadecylphenol (0.5 mole) | 173 |
| Acetaldehyde (0.5 mole) | 22 |
| Oxalic acid | 1 |
| Xylene | 75 |

The same procedure was followed as in Example 87a, except that octadecylphenol was used instead of menthylphenol. The solvent-free resin was soft to semi-brittle in consistency and reddish in color.

*Example 90a*

| | Grams |
|---|---|
| Menthylphenol (3.0 moles) | 696 |
| Heptaldehyde (3.0 moles) | 343 |
| Oxalic acid | 6 |
| Xylene | 500 |

The procedure employed was essentially the same as in Example 87a where acetaldehyde was employed, but with the difference that due to the fact that heptaldehyde is a higher boiling aldehyde, it was not necessary to dilute it with the xylene. For this reason all the xylene was added to the initial mixture, and the heptaldehyde was added by means of a separatory funnel. Thus, the phenol, acid catalyst, and solvent were combined in a resin pot by the same procedure used in Example 87a. The resin, after removal of the solvent by distillation, was clear, light in color, had a soft, tacky appearance and was xylene-soluble.

*Example 91a*

| | Grams |
|---|---|
| Nonylphenol (1.0 mole) | 220 |
| Heptaldehyde (1.0 mole) | 114 |
| Oxalic acid | 2 |
| Xylene | 150 |

The same procedure was followed as in Example 90a preceding. The solvent-free resin was dark amber in color and semi-fluid or tacky in consistency.

*Example 92a*

| | Grams |
|---|---|
| Menthylphenol (1.0 mole) | 232 |
| Benzaldehyde (1.0 mole) | 106 |
| Oxalic acid | 2 |
| Xylene | 150 |

The procedure followed was the same as in Example 90a. The solvent-free resin was semi-hard to pliable and light amber in color.

*Example 93a*

| | Grams |
|---|---|
| Nonylphenol (1.5 moles) | 330 |
| Benzaldehyde (1.5 moles) | 159 |
| Oxalic acid | 3 |
| Xylene | 200 |

The procedure followed was the same as in Example 90a. The solvent-free resin was clear, semi-soft to pliable and amber in color.

*Example 94a*

| | Grams |
|---|---|
| Menthylphenol (1.0 mole) | 232 |
| Propionaldehyde 96% (1.0 mole) | 60.5 |
| Oxalic acid | 2 |
| Xylene | 150 |

The same procedure was followed as in Example 90a. The solvent-free resin was amber in color, semi-hard or pliable in consistency, with a tendency towards tackiness.

*Example 95a*

| | Grams |
|---|---|
| Nonylphenol | 220 |
| Propionaldehyde 96% (1.0 mole) | 60.5 |
| Oxalic acid | 2 |
| Xylene | 150 |

The same procedure was followed as in Example 90a. The solvent-free resin was amber in color and semi-fluid or tacky in consistency.

*Example 96a*

| | Grams |
|---|---|
| Nonylphenol (1.0 mole) | 220 |
| 2-ethyl-3-propyl acrolein (1.0 mole) | 126 |
| Oxalic acid | 2.5 |
| Xylene | 100 |

The same procedure was followed as in Example 90a. The solvent-free resin was dark in color and soft to fluid in consistency.

*Example 97a*

| | Grams |
|---|---|
| Menthylphenol (1.0 mole) | 232 |
| 2-ethyl-3-propyl acrolein (1.0 mole) | 126 |
| Oxalic acid | 2.5 |
| Xylene | 150 |

The same procedure was followed as in Example 90a. The solvent-free resin was dark in color and soft to fluid in consistency.

Example 98a
See Example 85a of Patent 2,499,370.

Example 99a
See Example 86a of Patent 2,499,370.

Example 100a
See Example 87a of Patent 2,499,370.

Example 101a
See Example 88a of Patent 2,499,370.

Example 102a
See Example 89a of Patent 2,499,370.

Example 103a
See Example 90a of Patent 2,499,370.

Example 104a
See Example 91a of Patent 2,499,370.

Example 105a
A duplicate of the resin described in Example 80a was prepared and subjected to distillation. Distillation without vacuum was first employed to eliminate the xylene. After the elimination of xylene the resin was subjected to vacuum distillation to 225° C., at 25 mm. Hg. The resulting resin was a hard, brittle, amber colored resin, xylene-soluble and had a melting point of 145° to 150° C.

Example 106a
A duplicate of the resin described in Example 81a was prepared and subjected to distillation, including vacuum distillation, in the same manner as described in Example 105a. The resulting resin was a clear, hard, brittle, xylene-soluble resin, amber colored, and had a melting point of 80° to 85° C.

Example 107a
See Example 94a of Patent 2,499,370.

Example 108a
See Example 95a of Patent 2,499,370.

Example 109a
See Example 96a of Patent 2,499,370.

Example 110a
See Example 97a of Patent 2,499,370.

Example 111a
See Example 98a of Patent 2,499,370.

Example 112a
See Example 99a of Patent 2,499,370.

Example 113a
See Example 100a of Patent 2,499,370.

Example 114a

| | Grams |
|---|---|
| Dodecylphenol | 262 |
| Benzaldehyde | 106 |
| Oxalic acid | 2.5 |
| Xylene | 100 |

The procedure followed was that of Example 87a. The solvent-free resin was clear, light in color, xylene-soluble, and soft to pliable in consistency.

Example 115a
See Example 102a of Patent 2,499,370.

Example 116a

| | Grams |
|---|---|
| Menthyl phenol (1.0 mole) | 232 |
| Nonylphenol (1.0 mole) | 220 |
| Formaldehyde 37% (2.0 moles) | 162 |
| Oxalic acid | 1.5 |
| Monoalkyl ($C_{10}$–$C_{20}$, principally $C_{12}$–$C_{14}$) benzene monosulfonic acid sodium salt | 1.5 |
| Xylene | 200 |

The procedure followed was that of Example 1a. The resulting product was light amber colored resin having a melting point of 115° to 120° C. The solvent free resin was similar in appearance to the resin of Example 80a.

Example 117a

| | Grams |
|---|---|
| Para-tertiary butyl phenol (7.0 moles) | 1050 |
| Formaldehyde 38.7% (6.65 moles) | 516 |
| Oxalic acid | 5 |
| Dioctyl ester of sodium sulfosuccinic acid | 2 |

All the materials were placed in a 3-liter three-necked glass flask fitted with an efficient stirrer, thermometer and reflux condenser and agitated continuously. The mixture was refluxed for 85 minutes at 88°–92° C., at which time it became a thick, creamy mass. It was dehydrated by distilling at 97°–162° C., for 5 hours. A total of 395 grams of water was removed. Yield was 1112 grams of hard, brittle, yellow resin, of melting point 118°–126° C.

Example 118a
1050 grams of p-tertiary butylphenol, 500 grams of 39.7% formaldehyde, 5 grams of oxalic acid and 2 grams of Aerosol O. T. are refluxed for 85 minutes at 88°–92° C., and then dehydrated by distilling at 97°–148° C. for 5 hours. 403 grams of water in one case were removed. The product was a hard, brittle, yellow resin, melting at 124°–127° C., yield 1093 grams.

In a number of the foregoing examples, phenols have been identified simply as "nonyl phenol," or "octadecyl phenol," or the like, without specific designation of the position of substitution or the structure of the substituent radical. In such cases, the phenols meant are either the commercial products distributed under these names, or, if the products are not commercially available, the products obtained by customary syntheses from phenol, metacresol or 3,5-xylenol; and consist mainly of the para-substituted product, usually associated with some of the ortho-substituted product, perhaps a very small proportion of meta-substituted material, some impurities, etc. Also it is to be understood that all of the products of the foregoing examples, unless it is otherwise stated in the example, are soluble in xylene, at least to an extent sufficient to permit the use of xylene as the solvent in oxyalkylation.

It will be noted that the resins used as parent materials, as illustrated by Examples 1a to 118a, are 2,4,6 (i. e., 2, 4 or 6) $C_4$- to $C_{18}$-hydrocarbon-substituted monocyclic phenol—$C_1$- to $C_8$-aldehyde resins. Advantageously the resin molecule has 3 to 7 phenolic residues; it may have more. Most of the resins herein described, particularly in the absence of a secondary heating step, contain 3 to 6 or 7 phenolic nuclei, with approximately 4½ or 5½ nuclei as an average, based on molecular weight determinations following the cryoscopic procedure described in our Patent 2,499,370. In the appended claims we have used "low-stage" to mean 3 to 7 units based on average molecular weight. These give the most desirable final products.

The oxyalkylation of the resins to produce the oxyalkylated products from which the products of the present invention are prepared is carried out in a manner described in our said Patent 2,499,370, except that the extent of oxyalkylation is limited to from ½ to 2 moles of alkylene oxide per phenolic nucleus, advantageously about 1 mole or slightly more being used, so that the oxyalkylated products are substantially free from phenolic hydroxyl groups.

In Examples 1b to 5b, and the table which follows, directions are given for the production of the oxyalkylated intermediate which are subsequently esterified to produce the final compositions of the invention. Because of advantages which follow from the use of ethylene oxide, partly because of its low cost and partly because of the excellent results it gives, most of the examples relate to oxyalkylation with ethylene oxide. However, oxyalkylation with propylene oxide, butylene oxide, glycide and methylglycide, gives substantially equivalent products. Glycide, if used, should be handled with great caution.

Example 1b 4350 grams of the resin of Example 117a dissolved in 4350 grams of hot xylene were placed in a stainless steel autoclave with 19 grams of sodium methylate and 1200 grams of ethylene oxide, and the mixture was heated to 150° C., when a drop in pressure was noted. The maximum pressure observed during the operation was 120 p. s. i. gauge. Heating was continued until the temperature reached 245° C., when the heat was shut off and the autoclave allowed to cool. Time above 150° C. was 1¾ hours. The product obtained was a light tan semi-crystalline mass.

Example 2b

The same reactants and procedure were employed as in Example 1b, preceding, except that propylene oxide was used instead of ethylene oxide, in equivalent proportions. The final product was very similar to the product of Example 1b. Butylene oxide, similarly used, gives a similar product.

Example 3b

The same reactants were employed as in Example 1b, except that the equivalent amount of glycide was used instead of ethylene oxide, the reaction was conducted with extreme care and the glycide was added in small proportions, followed by the allowance of time for reaction before the addition of the next portion. Again the product was similar to the product of Example 1b in appearance.

Example 4b 594 grams of the resin of Example 10a dissolved in 396 grams of xylene and 2.4 grams of sodium methylate and 175 grams of ethylene oxide were charged into a stainless steel autoclave and heated to 148° C. The maximum pressure observed was 100 p. s. i. gauge. The reaction time was 2.5 hours. The solvent-free oxyethylated resin had a melting point of 58° to 66° C.

Example 5b 322.8 grams of the resin of Example 118a, slurried with 322.8 grams of xylene, and admixed with 88 grams of ethylene oxide and 1.5 grams of sodium methylate, were charged into the stainless steel autoclave. The maximum temperature observed was 198° C., and the maximum pressure 101 p. s. i. gauge. The reaction time was 3 hours. The xylene-containing reaction product was a semi-crystalline mass.

In the table which follows are given the data for the oxyethylation with amounts of ethylene oxide ranging from about one-half mole to something less than two moles per hydroxyl equivalent (of the resin) of a large number of the resins, the production of which is illustrated in Examples 1a through 118a.

The first column (A) gives the example number where the production of the resin is described; the second column (B) gives the weight, in grams, of the resin which is oxyethylated; the third (C), the weight, in grams, of the solvent in the solution; the fourth (D), the weight, in grams, of catalyst (sodium methylate) used; the fifth (E), the amount of ethylene oxide added, in grams; the sixth (F), the maximum temperature used; the seventh (G), the maximum pressure observed, in pounds per square inch gauge; and the eighth (H), the time of reaction, in hours.

| A | B | C | D | E | F | G | H |
|---|---|---|---|---|---|---|---|
| 1a | 162 | 162 | 1.6 | 44 | 145 | 175 | 3 |
| 2a | 162 | 162 | 1.6 | 44 | 150 | 170 | 3 |
| 3a | 218 | 218 | 1.8 | 44 | 155 | 165 | 3.5 |
| 4a | 196 | 196 | 1.8 | 44 | 150 | 165 | 3 |
| 5a | 196 | 196 | 1.8 | 44 | 150 | 160 | 3.5 |
| 6a | 162 | 162 | 1.8 | 44 | 145 | 170 | 2.5 |
| 7a | 202 | 202 | 1.8 | 44 | 160 | 160 | 3 |
| 8a | 218 | 218 | 1.8 | 44 | 160 | 165 | 3 |
| 9a | 196 | 196 | 1.8 | 44 | 155 | 160 | 3 |
| 10a | 594 | 396 | 2.4 | 112 | 149 | 100 | 1 |
| 10a | 594 | 396 | 2.4 | 80 | 155 | 40 | 4 |
| 10a | 594 | 396 | 2.4 | 225 | 150 | 75 | 3 |
| 10a | 594 | 396 | 2.4 | 285 | 160 | 100 | 4 |
| 11a | 5,370 | 6,690 | 26.9 | 1,420 | 209 | 70 | 6 |
| 11a | 5,400 | 6,700 | 27.1 | 700 | 204 | 65 | 5 |
| 11a | 5,350 | 6,680 | 27.0 | 2,700 | 212 | 85 | 7 |
| 12a | 162 | 162 | 1.6 | 44 | 140 | 170 | 3 |
| 13a | 162 | 162 | 1.6 | 44 | 154 | 126 | 2 |
| 14a | 176 | 176 | 1.8 | 44 | 160 | 155 | 2.5 |
| 15a | 176 | 176 | 1.8 | 44 | 130 | 135 | 4 |
| 16a | 176 | 176 | 1.8 | 44 | 160 | 105 | 2 |
| 17a | 176 | 176 | 1.8 | 44 | 150 | 100 | 2.5 |
| 18a | 190 | 190 | 1.8 | 44 | 165 | 150 | 4 |
| 19a | 218 | 218 | 1.8 | 44 | 165 | 155 | 4 |
| 20a | 182 | 182 | 1.8 | 44 | 150 | 150 | 2.5 |
| 21a | 188 | 188 | 1.9 | 44 | 155 | 120 | 4.5 |
| 22a | 210 | 210 | 2.1 | 44 | 155 | 125 | 5 |
| 23a | 176 | 176 | 1.8 | 44 | 155 | 145 | 3.3 |
| 24a | 176 | 176 | 1.8 | 44 | 148 | 148 | 3.5 |
| 25a | 176 | 176 | 1.8 | 44 | 140 | 125 | 6 |
| 26a | 176 | 176 | 1.8 | 44 | 150 | 140 | 6 |
| 27a | 190 | 190 | 1.9 | 44 | 156 | 130 | 4.5 |
| 28a | 190 | 100 | 1.9 | 44 | 140 | 95 | 1 |
| 29a | 190 | 190 | 1.8 | 44 | 145 | 115 | 3 |
| 30a | 190 | 190 | 1.9 | 44 | 130 | 140 | 2.5 |
| 31a | 232 | 232 | 2.3 | 44 | 130 | 130 | 3 |
| 31a | 232 | 232 | 2.4 | 73 | 140 | 125 | 4 |
| 31a | 232 | 232 | 2.3 | 31 | 145 | 135 | 4.5 |
| 32a | 196 | 196 | 2.0 | 44 | 150 | 125 | 3 |
| 33a | 202 | 202 | 2.0 | 44 | 135 | 135 | 1 |
| 34a | 224 | 224 | 2.2 | 44 | 135 | 145 | 4 |
| 35a | 260 | 260 | 2.6 | 44 | 145 | 130 | 3.5 |
| 35a | 260 | 260 | 2.5 | 33 | 140 | 125 | 3 |
| 35a | 260 | 260 | 2.6 | 66 | 145 | 135 | 3 |
| 36a | 246 | 246 | 2.4 | 44 | 140 | 130 | 3 |
| 37a | 246 | 246 | 2.5 | 44 | 145 | 135 | 3 |
| 38a | 266 | 266 | 2.7 | 44 | 145 | 133 | 0.5 |
| 39a | 272 | 272 | 2.7 | 44 | 150 | 140 | 0.8 |
| 40a | 252 | 252 | 2.5 | 44 | 135 | 96 | 2.5 |
| 41a | 238 | 238 | 2.4 | 44 | 144 | 160 | 4.5 |
| 42a | 238 | 238 | 2.4 | 44 | 150 | 125 | 1.5 |
| 43a | 258 | 258 | 2.6 | 44 | 135 | 90 | 0.8 |
| 44a | 264 | 264 | 2.6 | 44 | 135 | 150 | 5.5 |
| 45a | 204 | 204 | 2.0 | 44 | 142 | 92 | 4.5 |
| 46a | 190 | 190 | 1.9 | 44 | 144 | 153 | 3 |
| 47a | 190 | 190 | 1.9 | 44 | 125 | 120 | 2 |
| 48a | 210 | 210 | 2.1 | 44 | 140 | 130 | 0.8 |
| 49a | 216 | 216 | 2.2 | 44 | 142 | 120 | 2 |
| 50a | 272 | 272 | 2.7 | 44 | 138 | 133 | 5.3 |
| 51a | 258 | 258 | 2.6 | 44 | 142 | 132 | 1.5 |
| 52a | 314 | 314 | 3.1 | 44 | 148 | 140 | 3.5 |
| 53a | 242 | 242 | 2.4 | 44 | 113 | 107 | 2 |
| 54a | 221 | 221 | 2.2 | 55 | 120 | 110 | 3 |
| 55a | 176 | 176 | 1.8 | 44 | 165 | 160 | 2 |
| 56a | 162 | 162 | 1.6 | 44 | 140 | 160 | 2 |
| 56a | 162 | 162 | 1.6 | 59 | 145 | 155 | 2 |
| 56a | 162 | 162 | 1.6 | 29 | 145 | 160 | 2 |
| 57a | 182 | 182 | 1.8 | 44 | 150 | 145 | 2 |
| 58a | 188 | 188 | 1.8 | 44 | 155 | 150 | 2.5 |

| A | B | C | D | E | F | G | H |
|---|---|---|---|---|---|---|---|
| 59a | 162 | 162 | 1.6 | 44 | 150 | 140 | 2 |
| 60a | 176 | 176 | 1.8 | 44 | 155 | 150 | 2 |
| 61a | 162 | 162 | 1.6 | 44 | 155 | 145 | 2 |
| 62a | 218 | 218 | 2.2 | 44 | 160 | 150 | 3 |
| 62a | 218 | 218 | 2.3 | 79 | 150 | 145 | 2.5 |
| 62a | 218 | 218 | 2.2 | 35 | 165 | 155 | 3.5 |
| 63a | 176 | 176 | 1.8 | 44 | 160 | 155 | 2 |
| 64a | 162 | 162 | 1.6 | 44 | 150 | 140 | 2 |
| 65a | 182 | 182 | 1.8 | 44 | 155 | 150 | 2 |
| 66a | 188 | 188 | 1.9 | 44 | 150 | 130 | 2.5 |
| 67a | 162 | 162 | 1.6 | 44 | 150 | 145 | 2 |
| 68a | 176 | 176 | 1.8 | 44 | 150 | 145 | 2 |
| 69a | 162 | 162 | 1.6 | 44 | 150 | 140 | 2.5 |
| 70a | 218 | 218 | 2.2 | 44 | 155 | 150 | 3.5 |
| 71a | 176 | 176 | 1.8 | 44 | 150 | 140 | 2 |
| 72a | 176 | 176 | 1.8 | 44 | 160 | 155 | 2 |
| 73a | 218 | 218 | 2.2 | 44 | 160 | 150 | 4.5 |
| 74a | 188 | 188 | 1.9 | 44 | 150 | 135 | 4 |
| 75a | 182 | 182 | 1.8 | 44 | 145 | 140 | 2 |
| 76a | 190 | 190 | 1.9 | 44 | 150 | 140 | 4 |
| 77a | 176 | 176 | 1.8 | 44 | 155 | 145 | 5 |
| 78a | 232 | 232 | 2.3 | 44 | 135 | 130 | 3 |
| 79a | 176 | 176 | 1.8 | 44 | 140 | 106 | 3 |
| 80a | 244 | 244 | 2.5 | 44 | 150 | 140 | 1 |
| 80a | 244 | 244 | 2.5 | 23 | 155 | 145 | 1.5 |
| 80a | 244 | 244 | 2.5 | 62 | 145 | 135 | 0.8 |
| 81a | 232 | 232 | 2.3 | 44 | 140 | 100 | 0.8 |
| 81a | 232 | 232 | 2.3 | 85 | 135 | 110 | 1.0 |
| 81a | 232 | 232 | 2.3 | 22 | 150 | 120 | 1.5 |
| 82a | 358 | 358 | 3.6 | 44 | 150 | 140 | 2 |
| 82a | 358 | 358 | 3.6 | 79 | 145 | 125 | 3 |
| 82a | 358 | 358 | 3.6 | 24 | 140 | 120 | 3 |
| 83a | 224 | 224 | 2.2 | 44 | 130 | 162 | 0.5 |
| 84a | 246 | 246 | 2.5 | 44 | 158 | 185 | 3.5 |
| 85a | 274 | 274 | 2.7 | 44 | 152 | 190 | 1.3 |
| 85a | 274 | 274 | 2.7 | 84 | 165 | 170 | 2 |
| 85a | 274 | 274 | 2.7 | 26 | 170 | 180 | 2 |
| 86a | 232 | 232 | 2.3 | 44 | 138 | 82 | 1 |
| 87a | 258 | 258 | 2.6 | 44 | 150 | 140 | 2 |
| 88a | 246 | 246 | 2.5 | 44 | 145 | 140 | 3 |
| 88a | 246 | 246 | 2.5 | 75 | 150 | 145 | 2 |
| 88a | 246 | 246 | 2.5 | 22 | 160 | 150 | 3 |
| 89a | 372 | 372 | 3.7 | 44 | 160 | 145 | 2 |
| 89a | 372 | 372 | 3.7 | 84 | 155 | 135 | 4 |
| 89a | 372 | 372 | 3.7 | 22 | 160 | 140 | 3 |
| 90a | 328 | 328 | 3.3 | 44 | 144 | 133 | 10 |
| 91a | 316 | 316 | 3.2 | 44 | 140 | 130 | 2 |
| 92a | 320 | 320 | 3.2 | 44 | 135 | 130 | 5 |
| 93a | 308 | 308 | 3.1 | 44 | 140 | 135 | 6 |
| 94a | 272 | 272 | 2.7 | 44 | 145 | 130 | 4 |
| 95a | 260 | 260 | 2.6 | 44 | 150 | 140 | 3 |
| 96a | 328 | 328 | 3.3 | 44 | 144 | 115 | 2.5 |
| 97a | 340 | 340 | 3.4 | 44 | 150 | 140 | 3 |
| 98a | 244 | 244 | 2.4 | 44 | 140 | 130 | 4 |
| 99a | 232 | 232 | 2.3 | 44 | 150 | 95 | 1.5 |
| 100a | 232 | 232 | 2.3 | 44 | 125 | 130 | 5 |
| 101a | 298 | 298 | 3.0 | 44 | 135 | 145 | 1 |
| 102a | 310 | 310 | 3.1 | 44 | 165 | 165 | 1 |
| 103a | 232 | 232 | 2.3 | 44 | 150 | 128 | 4 |
| 104a | 232 | 232 | 2.3 | 44 | 130 | 125 | 4 |
| 105a | 244 | 244 | 2.4 | 44 | 140 | 120 | 2.3 |
| 106a | 232 | 232 | 2.3 | 44 | 145 | 105 | 1 |
| 107a | 244 | 244 | 2.4 | 44 | 145 | 135 | 3 |
| 108a | 232 | 232 | 2.3 | 44 | 140 | 125 | 2 |
| 109a | 232 | 232 | 2.3 | 44 | 142 | 134 | 2.5 |
| 110a | 232 | 232 | 2.3 | 44 | 150 | 145 | 4 |
| 111a | 246 | 246 | 2.5 | 44 | 135 | 140 | 2 |
| 112a | 274 | 274 | 2.7 | 44 | 140 | 145 | 2.5 |
| 113a | 274 | 274 | 2.7 | 44 | 150 | 140 | 3 |
| 114a | 350 | 350 | 3.5 | 44 | 142 | 138 | 4 |
| 115a | 246 | 246 | 2.5 | 44 | 150 | 140 | 2 |
| 116a | 238 | 238 | 2.4 | 44 | 155 | 135 | 3 |

In general, the appearance of the products, in the presence of the solvent, was that of a viscous liquid or a semi-crystalline mass, varying in color from light tan to reddish amber. For some subsequent applications of our materials, separation of the product from the solvent is unnecessary. For example, in using our finished intermediates as starting materials in certain esterification reactions, the products were not separated from the solvent prior to admixture with the desired acids for esterification.

Conversion of these oxyalkylated products into the esterified compositions of the invention involves admixture of the oxyalkylated product with the selected amount of acid or mixture of acids, followed by heating to esterifying temperature for a sufficient time to substantially completely esterify the acid. If the oxyalkylated product is produced in admixture with a solvent, it is unnecessary to remove the solvent prior to the addition of the acid as the solvent will be evaporated during the heating incident to esterification. Temperatures of 200° to 250° C., advantageously about 235° C., are used for esterification. The time required varies from about 4 to 24 hours. Completion is shown by testing the acid number—a value below about 10 being required, or by a stroke cure test (cf. D'Alelio, Experimental Plastics and Synthetic Resins, 1946, p. 105)— a cure time at 200° C. of about 20 seconds or less usually indicating completion. Products with longer cure times, e. g., 30 seconds, are often satisfactory. Reference herein to "cure time" is to this test carried out in this way. During esterification, the reaction mass must be protected from the air, as by blanketing with an inert gas, if a light colored product is to be obtained.

In preparing coating compositions, the new esterified products are compounded with a solvent or solvents, pigments and driers in the usual way. Varnishes are prepared without pigments, enamels with pigments. Inks are prepared with pigments. The new products, for use in paints, are compounded with drying oils. Preparation of pigmented products is comparatively easy, because pigments are readily ground into the new products. Such compounded products have excellent shelf life, good spreading properties, give smooth, glossy films, which are weather resistant, durable, alkali and water resistant, retain their hardness even under conditions of high humidity, and have an excellent balance of hardness, toughness and flexibility.

The following examples, 1c to 38c, illustrate the production of new esterified compositions of the invention, and final coating compositions in which they are incorporated, by the esterification of oxyalkylated products of the type illustrated in Examples 1b through 5b, and the foregoing table, with the use of varying proportions of fatty acids, and varying proportions of polybasic acids, and the production of products ranging from the short oil type to the long oil type. Pigmented as well as unpigmented coating compounds are also illustrated.

*Example 1c*

90.5 grams of the oxyethylated product of Example 4b in 38 grams of xylene were mixed with 42 grams of linseed oil fatty acids and 22.2 grams of phthalic anhydride. The mixture was heated to 190° C. for 5 hours in a three-necked glass flask with a mechanical glass stirrer, to a stroke cure test time of 30 seconds (cure plate at 200° C.), and an acid number of 18.3. A 50% xylene solution of the product had a viscosity of approximately 65 centipoises. It gave non-brittle films of satisfactory color. A 60% xylene solution was a satisfactory coating composition. It was of medium oil type.

*Example 2c*

134.5 grams of a xylene solution of the oxyethylated resin of Example 4b, containing 96.5 grams of resin, were reacted with 46.7 grams of linseed oil fatty acids and 12.3 grams of phthalic anhydride by heating to 190° C., for 2.5 hours and at 220° to 225° C. for 4 hours, to a stroke cure time of 30 seconds (200° C.) and an acid value of 7.6. A 50% xylene solution of the product had a viscosity of approximately 65 centipoises. The product gave non-brittle films which were satisfactory in color. It was of medium oil type.

*Example 3c*

134.5 grams of the same resin-xylene solution were mixed with 37.2 grams of linseed oil fatty acids and 14.7 grams of phthalic anhydride and heated to 190° C. for 2.5 hours, and at 220° to 225° C. for 4 hours, to a cure time of 18 seconds, and an acid value of 21.8. A 50% xylene solution of this product had a viscosity of about 200 centipoises. A 70% solution was a satisfactory coating composition. Films prepared from this product were satisfactory as to color and flexibility. It was of medium oil type.

Example 4c 180 grams of a xylene solution of the oxyethylated resin of Example 5b, containing 47% solids, was mixed with 24.7 grams of phthalic anhydride and 46.7 grams of linseed oil fatty acids and heated to 200° to 240° C., to a cure time of 20 seconds and until an acid value of 5.4 was obtained. The period of time was about 8.1 hours. A 59% xylene solution of the product had a viscosity of about 50 centipoises. Films prepared from this product had a very pale color, become dust-free in air in 14 minutes and tack-free in 5.8 hours. It was of medium oil type.

Example 5c 24 pounds of a 46.5% slurry of the oxyethylation product of the resin of Example 11a (8.25 pounds resin plus 2.9 pounds ethylene oxide—see table) were reacted with 2.1 pounds of phthalic anhydride and 6.6 pounds of linseed oil fatty acids, and heated for 25 hours at 206° to 249° C., to a cure time of 16 seconds and an acid number of 3.1. A 52% solution of this esterified product in xylene had a viscosity of 78 centipoises and a Gardner color of 13. The clear film of this product had a dust-free time of 23 minutes and a tack-free time of 1.3 hours and produced a film of extremely high gloss. This film showed no effect from weathering after exposure for the equivalent of two years in an accelerated weather machine, and would not dissolve in 3% caustic after submersion for 504 hours. This product was pigmented with titanium dioxide at a vehicle-to-pigment ratio of 1:1, to produce high gloss weather-resistant enamel which had a dust-free time of 30 minutes and a tack-free time of one hour. It was of medium oil type.

Example 6c 28 pounds of the same resin slurry as in preceding Example 5c were reacted with 2.3 pounds phthalic anhydride and 7.3 pounds of soybean fatty acids. The materials were heated for 15 hours at 215° to 241° C., to a cure time of 30 seconds and an acid number of less than 1. This esterified product, in a 51% solution in xylene, had a viscosity of 100 centipoises and a Gardner color of 14. The clear film produced by this product had a dust-free time of 15 minutes and a tack-free time of 2.3 hours. Pigmented with titanium dioxide at a vehicle-to-pigment ratio of 1:1, it produced a high gloss enamel with high alkali and weather resistance. It was of medium oil type.

Example 7c 23 pounds of the same resin slurry as in preceding Example 5c were reacted with 1.2 pounds of phthalic anhydride and 9.6 pounds of linseed oil fatty acids. The materials were heated for 28 hours at a temperature of 226° to 238° C., to a cure time greater than 120 seconds and an acid number of less than 1. A 60% solution of this esterified product in xylene had a viscosity of 62 centipoises and a Gardner color of 11. Clear films sprayed from this solution had a dust-free time of 4 hours and a tack-free time of 6 hours. It was of long oil type.

Example 8c 26 pounds of the same resin slurry as in preceding Example 5c were reacted with 2.2 pounds of phthalic anhydride and 3.4 pounds of linseed oil fatty acids. These materials were heated for 5 hours at a temperature of 200° to 249° C., to a cure time of 5 seconds and an acid number of less than 1. A 47% solution of this esterified product in xylene had a viscosity of 550 centipoises and a Gardner color of 10. Clear films sprayed from a 42% solution of this esterified product had a dust-free time of 13 minutes. Pigmented with titanium dioxide at a vehicle-to-pigment ratio of 1:1, it gave a fast drying, high gloss enamel, with a dust-free time and tack-free time of 22 minutes. Clear and pigmented films of this product did not dissolve in 3% caustic when submerged for 3 weeks. It was of short oil type.

Example 9c 30.4 pounds of a 22% xylene solution of the cold-xylene-soluble portion of the oxyethylated product described in Example 5c preceding were reacted with 1.2 pounds of phthalic anhydride and 3.7 pounds of linseed oil fatty acids for 14½ hours at 210° to 239° C., to a cure time greater than 60 seconds and an acid number of 7.2. A 51% solution of this product in xylene had a viscosity of 52 centipoises. Films cast from a solution of this resin showed extremely high alkali resistance, with no noticeable change after 17 hours of submersion in 3% caustic alkali and remained clear after 3 weeks of submersion. It was of medium oil type.

Example 10c 8.4 pounds of the cold-xylene-insoluble portion of the oxyethylated resin described in Example 5c were reacted with 1.4 pounds of phthalic anhydride and 4.3 pounds of linseed fatty acids. The materials were heated for 6.5 hours at 224° to 230° C., to a cure time of 15 seconds and an acid number of 9. A 54% solution of this esterified product in xylene had a viscosity of 144 centipoises. Clear films sprayed in xylene solution had a dust-free time of 17 minutes and a tack-free time of 3 hours, and a Sward hardness of 45 after 24 hours of air drying and 50% relative humidity. Pigmented with titanium dioxide at a 1:1, vehicle-to-pigment, ratio, this resin produced a high gloss, fast drying enamel which was unaffected by submersion in 3% sodium hydroxide for three weeks. It was of short oil type.

Example 11c

The resin of Example 1a, oxyethylated with an equimolar proportion of ethylene oxide (see table) is heated with an equimolar proportion of tung oil fatty acids, the amount of oxyethylated resin being 206 grams and the amount of tung oil fatty acids being 270 grams. The reaction mixture is heated to about 200° C. for several hours, until the acid number is less than 10. The resulting product is of the long oil type. A product similarly prepared but using 140 grams of tung oil fatty acids is somewhat similar in properties, but gives lighter colored, harder films.

Example 12c

The product obtained in accordance with the preceding example by using the smaller quantity of tung oil, i. e., 140 grams, is heated to 200° C., for several hours with 24 grams of maleic anhydride, giving a product with low acid number which forms hard, clear films.

Example 13c

The procedure of Example 11c is repeated, using linseed oil fatty acids instead of tung oil fatty acids in the same amounts. The resulting products give films which are somewhat superior to those of the products of Example 11c, and the products show less tendency to gel. The use of equivalent proportions of dehydrated castor oil fatty acids instead of the tung or linseed fatty acids gives products similar to those obtained with the use of linseed fatty acids.

Example 14c

A Diels-Alder adduct is prepared from linseed oil and maleic anhydride in the conventional manner, and is then reacted in equimolar proportions with the same oxyethylated derivative of the resin of Example 1a used in Example 11c, 206 parts of the oxyethylated resin being used with 950 parts of the Diels-Alder adduct. The reaction was carried out by heating for 12 hours at about 200° C., to produce condensation. The resulting product is of the long oil type and gives flexible films. The use of one-half this quantity of the Diels-Alder adduct also gives useful products, the films from which tend to be somewhat harder.

Example 15c

This example serves to illustrate the effect of varying amounts of linseed fatty acids and phthalic anhydride on the para-tertiary-butylphenol resin from Example 1a, oxyethylated with an equimolar proportion of ethylene oxide (see table). The properties and conditions of reaction are recorded in the following table:

| Parts Oxy-ethylated Resin | Parts Solvent | Parts Linseed Fatty Acid | Parts Phthalic Anhydride | Temperature, °C. | Time (Hrs.) | Acid No. | Hydroxyl No. |
|---|---|---|---|---|---|---|---|
| 82.3 | 60.1 | 33.6 | 17.8 | 215–247 | 7⅔ | 8.4 | 36.6 |
| 82.3 | 60.1 | 28.0 | 14.8 | 205–237 | 10½ | 4.9 | 51.2 |
| 102.9 | 75.1 | 28.0 | 14.8 | 218–243 | 17 | 1.3 | 74.5 |
| 102.9 | 75.1 | 29.3 | 15.5 | 219–239 | 18 | 2.6 | 73.8 |
| 82.3 | 60.1 | 46.3 | 12.2 | 218–246 | 25 | 1.9 | 47.4 |
| 102.9 | 75.1 | 29.3 | 16.3 | 217–238 | 10¼ | 2.3 | 72.5 |
| 102.9 | 75.1 | 29.3 | 18.3 | 229–238 | 7 | 4.1 | 67.7 |
| 102.9 | 75.1 | 29.3 | 23.2 | 230–242 | 4⅙ | 13.4 | 49.1 |
| 102.9 | 75.1 | 44.0 | 18.1 | 215–250 | 9 | 3.3 | 47.7 |
| 102.9 | 75.1 | 58.5 | 18.1 | 230–241 | 17⅔ | 4.6 | 30.5 |
| 82.3 | 60.1 | 110.9 | ------ | 227–240 | 24 | 3.6 | ---- |
| 82.3 | 60.1 | 106.4 | ------ | 231–241 | 13¾ | 1.7 | 9.0 |
| 82.3 | 60.1 | 92.5 | 4.6 | 213–242 | 15¼ | 4.3 | 11.2 |
| 82.3 | 60.1 | 74.5 | 9.0 | 230–237 | 19 | 1.9 | 14.8 |
| 82.3 | 60.1 | 62.8 | 12.0 | 224–248 | 19½ | 3.6 | 15.9 |

The products have a range of properties corresponding to those observed in short to long oil alkyd resins.

Example 16c 82.3 grams of the oxyethylated product of Example 1a, resin oxyethylated with an equimolar proportion of ethylene oxide (see table), were reacted with 12 grams of phthalic anhydride and 62.8 grams of soybean fatty acids for 22½ hours at 233° to 238° C. to produce an esterified product with an acid number of 4.7. A 49.7% solution of this resin had a Gardner color of 12. This product, when cast and air-dried, with 0.65% lead, 0.05% manganese and 0.02% cobalt, had a Sward hardness of 15 at the end of 24 hours. It was of the long oil type. (The driers were added as naphthenates.)

Example 17c 102.9 grams of the oxyethylated product described in Example 15c, were reacted with 35.1 grams of dehydrated castor fatty acids and 17 grams of phthalic anhydride. The materials were heated from 230° to 249° C. for 9⅓ hours to a cure time of 19 seconds and an acid number of less than 10. A 50% solution of this product had a viscosity of more than 100 centipoises and a Gardner color of 10. The film produced from this product was fast drying, light colored and hard. It was of the short oil type.

Example 18c

The resin produced from Example 31a was treated with 1/10 mole ethylene oxide per phenolic hydroxyl (see table) and reacted with linseed fatty acids and succinic anhydride. 105 grams of the oxyethylated resin, 39.2 grams of linseed fatty acids and 6 grams of the succinic anhydride, were heated for 16 hours at 210° to 242° C. to a cure time of 25 seconds and an acid number of 5.2. A 55% solution of this esterified product in xylene had a viscosity of 110 centipoises and a satisfactory color. When this solution air dried with 0.65% lead, 0.06% cobalt, and 0.02% manganese, introduced in the form of naphthenates, it formed light colored and hard films. It was of the medium oil type.

Example 19c

The resin produced from Example 85a was oxyethylated with 1.9 moles of ethylene oxide per phenolic hydroxyl (see table). 107 grams of this oxyethylated material, 33.2 grams linseed fatty acids, and 11.1 grams of adipic acid, were heated for 20 hours at 202° to 246° C. to an acid number of 2, and a hydroxyl number of 33. The xylene solution of the esterified product containing 47.2% solids had a viscosity of 90 centipoises and a yellow color. It was of medium oil type.

Example 20c

The product of Example 44a was oxyethylated with an equimolar proportion of ethylene oxide (see table). 183 grams of a 50% xylene slurry of this oxyethylated material, 29.4 grams of linseed fatty acids, and 16.7 grams of sebacic acid, were heated for 19⅓ hours at 205° to 247° C. to reach a cure time of 30 seconds and an acid number of 3.8. A 51% solution of this esterified product in xylene had a viscosity of 105 centipoises. When pigmented with 90% titanium dioxide and 10% zinc oxide at a 1:1 pigment-vehicle ratio it produced a satisfactory enamel. It was of the medium oil type.

Example 21c

The product of Example 82a was oxyethylated with an equimolar proportion of ethylene oxide (see table). 302 grams of a 40% xylene slurry of this oxyethylated resin were heated with 21 grams of linseed fatty acids and 12.5 grams of diglycollic acid for 22 hours at 207° to 248° C. to produce a resin of an acid number of 4 and a hydroxyl number of 37.2. A 62% solution of this resin in xylene had a viscosity of 165 centipoises. Films of this material were baked at 80° C. for 1½ hours with 0.06% cobalt, added as cobalt naphthenate, and were hard and had a good gloss. This was a medium oil resin type.

Example 22c

The resin prepared in Example 56a was oxyethylated with an equimolar proportion of ethylene oxide (see table). 206 grams of this oxyethylated resin, and 105 grams of dimer fatty acids, which consist predominantly of the dimer polymer of linoleic acid, were heated for 22 hours at 210° to 240° C. to give a product that had an acid number under 10 and was soluble in xylene. The product was a dark amber liquid and had a viscosity of 3000 centipoises. This was a resin of the long oil type.

Example 23c 298 grams of the oxyethylated resin used in Example 15c were mixed with 490 grams of a 50% xylene solution of the Clocker adduct prepared from heating 200 grams of oleic acid and 45 grams of crotonic acid at 240° to 250° C. for 2 hours. These materials were heated for 22½ hours at 208° to 247° C. A 50% xylene solution of this esterified product was treated with a suitable quantity of metallic driers as illustrated in Example 18c and dried to a hard film at room temperature. These films showed good water and solvent resistance. This was a resin of the long oil type.

Example 24c

The resin of Example 57a was oxyethylated in equimolar proportion with ethylene oxide (see table). 90.5 grams of this oxyethylated resin and 44.8 grams of linseed fatty acids were heated with 21.2 grams of the terpene-maleic acid adduct WW grade (as exemplified by Hercules Powder Company Petrex). The materials were heated to 200° C. to 230° C. for 14 hours until a cure time of 20 seconds was reached. A 50% solution of this esterified product in xylene had an acid number of 4 and a viscosity of 200 centipoises. Films baked at 150° C. for one hour were hard and had a high gloss. This product was of the long oil type.

Example 25c

The resin produced from Example 91a was oxyethylated with an equimolar proportion of ethylene oxide (see table). 144 grams of this oxyethylated resin and 46.7 grams of dehydrated castor fatty acids were heated with 60.4 grams of the cyclopentadiene-maleic acid Diels-Alder adduct. The materials were heated for 13 hours at 250° to 248° C. to a cure time of 18 seconds and an acid value of 5.9. When air-dried with 0.65% lead, 0.05% manganese, and 0.02% cobalt, all as naphthenates, hard flexible films were produced in 10 hours. Baked at 150° C. without drier, films of excellent color, hardness and flexibility were produced. This product was of the medium oil type.

Example 26c 205 grams of a 58.4% slurry of the oxyethylated product of Example 117a, which had been reacted with 0.85 mole ethylene oxide per mole of resin (see table), were reacted with 24.7 grams of phthalic anhydride and 46.6 grams of linseed fatty acid. The mixture was heated for 7 hours at 200° to 230° C. to a cure time of 20 seconds and an acid number of 6. A 50% solution of this esterified product had a viscosity of 22 centipoises and a very light color. When air-dried with the use of siccatives, films with very pale color and good flexibility were produced. This was a product of the long oil type.

Example 27c

The product of Example 10a was oxyethylated with 0.75 mole of ethylene oxide per mole of resin (see table). 168.5 grams of a 72.5% slurry of this oxyethylated resin, were mixed with 16.6 grams of phthalic anhydride and 63 grams of linseed fatty acids. The materials were heated for 6 hours at 190° to 225° C. to produce a product having a cure time of 22 seconds, and an acid number of 9.5. A 50% solution in xylene of this esterified product had a viscosity of 80 centipoises and when cast on glass plates and air-dried gave films of good flexibility, and moderate film hardness. This was a product of the long oil type.

Example 28c

The oxyethylated resin used was the same as that in Example 27c, preceding. 168.5 grams of a 72.5% slurry of this oxyethylated resin were mixed with 19.8 grams of phthalic anhydride and 37.4 grams of linseed fatty acids. The materials were heated for 7½ hours at 190° C. to an acid number of 9.3 and a cure time of 12 seconds. A 50% solution of this esterified product had a viscosity of 200 centipoises and satisfactory color. This resin, pigmented or clear, gave fast drying and hard films when air-dried with the usual amounts of siccatives. This product was of the medium oil type.

Example 29c

The product of Example 10a was reacted with 0.5 mole ethylene oxide so that 50% of the phenolic hydroxyls were oxyethylated (see table). 205 grams of a slurry of this partially oxyethylated material, containing 66.4% of solid material, were mixed with 56 grams of linseed fatty acids and 14.7 grams of phthalic anhydride. The material was heated for 27 hours at 210° to 215° C. to produce an esterified product with a cure time of 50 seconds, and an acid number of 12.4. A 50% solution of this product had a viscosity of 200 centipoises and a Gardner color of 14. The film produced from this solution had excellent air-drying properties and a Sward hardness of 32 after 48 hours of air-drying. It was of the medium oil type.

Example 30c

The resin produced from Example 112a was oxyethylated with an equimolar proportion of ethylene oxide (see table). 318 grams of the oxyethylated resin, 36 grams of phthalic anhydride, and 117½ grams of linseed fatty acids were heated for 18 hours at 210° to 245° C. to an acid number of 7. This resin, when baked at 80° C.

for 1½ hours, gave clear light-colored films. It was of the medium oil type.

Example 31c

The resin produced in Example 94a was oxyethylated with an equimolar proportion of ethylene oxide (see table). 158 grams of the oxyethylated resin, 5.6 grams of phthalic anhydride, 56 grams of tung fatty acids, and 56 grams of soy bean fatty acids were heated at 205° to 217° C. for 10 hours, to an acid number of 9.5. A 55% xylene solution of this esterified product had a viscosity of 250 centipoises. This product was of the long oil type.

Example 32c 4.5 pounds of a 60% xylene solution of the esterified product of Example 7c, were mixed with 2.5 pounds of titanium dioxide, 4 pounds of lithopone, one pound of refined linseed oil, 0.5 pound of Z-2 bodied linseed oil, 0.5 pound of xylene, 0.1 pound 8% lead naphthenate, .025 pound manganese naphthenate, and .025 pound cobalt naphthenate. These materials, after milling, produced a semi-gloss white paint.

Example 33c 102.9 grams of the oxyethylated product used in Example 15c were mixed with 18.6 grams of phthalic anhydride and 29.3 grams of soybean fatty acids. These materials were heated at 213° to 236° C. for 11 hours to a cure time of 15 seconds and an acid number of 3.1. A 48.4% xylene solution of this esterified product had a viscosity of 140 centipoises and a Gardner color of 11. This product produced excellent air-drying films which were flexible, hard and very pale. These films, when subjected to radiation from a carbon arc for 300 hours, showed very slight yellowing. This product was of the short oil type.

Example 34c 102.9 grams of the oxyethylated resin as described in Example 15c, were mixed with 15.5 grams of phthalic anhydride and 29.3 grams of soybean fatty acids. These materials were heated at 212° to 246° C. for 19¼ hours to an acid number of 2.4, a hydroxyl number of 77.4, and a cure time of 20 seconds. A 51.4% solution of this resin in xylene had a viscosity of 275 centipoises and a Gardner color of 12. This material gave films of excellent air-drying and baking properties. When cast on glass or tinplate the esterified product, plus 0.65% lead, 0.05% manganese, and 0.02% cobalt, added as naphthenates, gave air dry films that had a dust-free time of 8 minutes and a tack-free time of 23 minutes. When baked at 150° C. for one hour with no drier, films were produced from this material that were very pale, flexible and had a Sward hardness of 43 after storage 24 hours at 100% relative humidity. These same films, when subjected to radiation with a carbon arc for 300 hours, showed no yellowing or adverse effects. Baked films of this resin, after submersion in 3% sodium hydroxide for three weeks, showed no discoloration or blushing. This resin was of the medium oil type.

Example 35c 82.3 grams of the oxyethylated material described in Example 15c preceding, were reacted with 106.4 grams of soybean fatty acids. The fatty acids of the oxyethylated material were heated for 15 hours at 230° to 245° C. to an acid number of 1.7 and a cure time greater than 60 seconds. This product had a viscosity of 3620 centipoises. When baked with a small amount of siccative (0.02% cobalt) it gave a tack-free and print-free film. This product is of the long oil type.

Example 36c

The resin produced in Example 53a was oxyethylated with an equimolar amount of ethylene oxide (see table). 143 grams of this oxyethylated material, 16.7 grams of phthalic anhydride and 56 grams of linseed fatty acids, were heated to 220° to 249° C. for 15 hours to produce an esterified product of low acid number. This resin, when cast and baked, gave films which were hard and black. It was of a medium oil type.

Example 37c

The resin produced in Example 79a was oxyethylated with an equimolar amount of ethylene oxide (see table). 99 grams of this oxyethylated resin, 14.9 grams of phthalic anhydride, and 37.8 grams of dehydrated castor fatty acid were heated for 10 hours at 210° to 245° C. to a cure time of 20 seconds and an acid number of 0.75. This resin was a hard, tack-free solid, with a hydroxyl number of 50.8. It was of the medium oil type.

Example 38c

The resin produced in Example 103a was oxyethylated with an equimolar amount of ethylene oxide (see table). 193 grams of the oxyethylated resin, 150 grams of xylene, 25.9 grams of phthalic anhydride, and 78.5 grams of linseed fatty acids were heated for 16½ hours at 220° to 240° C. to a cure time of 19 seconds, an acid number of 5.5, and a hydroxyl number of 34.6. This esterified product, when pigmented with titanium dioxide at a vehicle-pigment ratio of 1:1, produced an excellent high gloss, fast-drying white enamel. It was of the medium oil type.

In the foregoing examples, the fact that a catalyst might be used in the esterification step was not illustrated. Catalysts, such as sulfuric acid, organic sulfo acids, litharge, and metallic carbonates, are infrequently used and might be used, but with subsequent effect on color of the final product.

The foregoing examples, 1c through 38c, illustrate the preparation of useful film-forming esterification products from a number of the oxyalkylated resins previously described. Similar esterification procedures, using the fatty acids of drying or semi-drying oils and, advantageously, a dicarboxy acid, applied to any of the oxyalkylated derivatives illustrated in Examples 1b through 5b and in the oxyethylation table, give useful products, varying in properties from those characteristic of the short oil type of product to those characteristic of the long oil type of product. In general, these are compatible with drying oils and so may be used as constituents of paints; and by themselves, when used with suitable solvents, they form useful varnishes which, on the incorporation of pigments, form useful enamels. In general, in use, the products will be employed along with appropriate siccatives in the usual way.

This application is in part a continuation of applications Serial Nos. 751,624, filed May 31, 1947, 518,660, 518,661, and 518,662, filed January 17, 1944, all of which are now abandoned.

We claim:

1. An esterification product of (1) an oxyalkylated $C_4$- to $C_{18}$-hydrocarbon-substituted difunctional monocyclic monohydric phenol—$C_1$- to $C_8$-aldehyde resin in which the $C_4$- to $C_{18}$-substitutent is in one of the positions, ortho and para, of the phenol and in which the aldehyde is one which has but one functional group reactive with said phenol in which the ratio of oxyalkylene groups to phenolic nuclei is from less than 2:1 to about 0.5:1, and the alkylene radicals of the oxyalkylene groups are those of alpha, beta-alkylene oxides and are selected from the class consisting of ethylene, propylene, butylene, hydroxypropylene and hydroxybutylene radicals, and the oxyalkylene groups are linked to the phenolic nuclei at the 1-position, and (2) the fatty acids of an oil of the class consisting of drying and semi-drying oils in amount at least 20% based stoichiometrically on the total hydroxyl content of the oxyalkylated resin; with the proviso that at least 50% stoichiometrically of the total hydroxyl content of the oxyalkylated resin is esterified by a material of the class consisting of such fatty acids and polycarboxy acids, with the proviso that the polycarboxy acid contains only oxygen, hydrogen and carbon and in amount does not exceed 70% based stoichiometrically on the total hydroxyl content of the oxyalkylated resin.

2. An esterification product of (1) an oxyalkylated $C_4$- to $C_{18}$-hydrocarbon-substituted difunctional monocyclic monohydric phenol—$C_1$- to $C_8$-aldehyde resin in which the $C_4$- to $C_{18}$-substitutent is in one of the positions, ortho and para, of the phenol and in which the aldehyde is one which has but one functional group reactive with said phenol in which the ratio of oxyalkylene groups to phenolic nuclei is from less than 2:1 to about 0.5:1, and the alkylene radicals of the oxyalkylene groups are those of alpha,beta-alkylene oxides and are selected from the class consisting of ethylene, propylene, butylene, hydroxypropylene and hydroxybutylene radicals, and the oxyalkylene groups are linked to the phenolic nuclei at the 1-position; (2) the fatty acids of an oil of the class consisting of drying and semi-drying oils in amount at least 20% based stoichiometrically on the total hydroxyl content of the oxyalkylated resin; and (3) a dicarboxy acid in amount not exceeding 70% based stoichiometrically on the total hydroxyl content of the oxyalkylated resin; with the proviso that at least 50% stoichiometrically of the total hydroxyl content of the oxyalkylated resin is esterified by a material of the class consisting of such fatty acids and dicarboxy acids, and the proviso that the dicarboxy acid contains only carbon, hydrogen and oxygen.

3. An esterification product of (1) an oxyalkylated $C_4$- to $C_{18}$-hydrocarbon-substituted difunctional monocyclic monohydric phenol—$C_1$- to $C_8$-aldehyde resin in which the $C_4$- to $C_{18}$-substituent is in one of the positions, ortho and para, of the phenol and in which the aldehyde is one which has but one functional group reactive with said phenol in which the ratio of oxyalkylene groups to phenolic nuclei is from less than 2:1 to about 0.5:1, and the alkylene radicals of the oxyalkylene groups are those of alpha, beta-alkylene oxides and are selected from the class consisting of ethylene, propylene, butylene, hydroxypropylene and hydroxybutylene radicals, and the oxyalkylene groups are linked to the phenolic nuclei at the 1-position; (2) the fatty acids of an oil of the class consisting of drying and semi-drying oils in amount at least 20% based stoichiometrically on the total hydroxyl content of the oxyalkylated resin; and (3) phthalic acid in amount not exceeding 70% based stoichiometrically on the total hydroxyl content of the oxyalkylated resin; with the proviso that at least 50% stoichiometrically of the total hydroxyl content of the oxyalkylated resin is esterified by a material of the class consisting of such fatty acids and phthalic acid.

4. An esterification product of (1) an oxyalkylation product of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one carboxyl group reactive toward said phenol; said resin being formed in the substantial absence of phenols of functionality greater than two; said phenol being of the formula

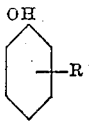

in which R is a hydrocarbon radical having at least 4 and not more than 18 carbon atoms and substituted in one of the positions, ortho and para; said oxyalkylated resin being characterized by the introduction into the resin molecule at the phenolic hydroxyl groups of a plurality of divalent radicals having the formula $R_1O$ in which $R_1$ is a member selected from the class consisting of ethylene radicals, propylene radicals, butylene radicals, hydroxypropylene radicals, and hydroxybutylene radicals, with the proviso that from about one-half to less than 2 moles of alkylene oxide be introduced for each phenolic nucleus; and (2) the fatty acids of an oil of the class consisting of drying and semi-drying oils in amount at least 20% based stoichiometrically on the total hydroxyl content of the oxyalkylated resin; with the proviso that at least 50% stoichiometrically of the total hydroxyl content of the oxyalkylated resin is esterified by a material of the class consisting of such fatty acids and polycarboxy acids, with the proviso that the polycarboxy acid contains only oxygen, hydrogen and carbon and in amount does not exceed 70% based stoichiometrically on the total hydroxyl content of the oxyalkylated resin.

5. An esterification product of (1) an oxyalkylation product of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one carboxyl group reactive toward said phenol; said resin being formed in the substantial absence of phenols of functionality greater than two; said phenol being of the formula

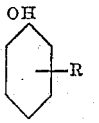

in which R is a hydrocarbon radical having at least 4 and not more than 18 carbon atoms and substituted in one of the positions, ortho and para; said oxyalkylated resin being characterized by the introduction into the resin molecule at the phenolic hydroxyl groups of a plurality of divalent radicals having the formula $R_1O$ in which $R_1$ is a member selected from the class consisting of ethylene radicals, propylene radicals, butylene radicals, hydroxypropylene radicals, and hydroxybutylene radicals, with the proviso that from about one-half to less than 2 moles of alkylene oxide be introduced for each phenolic nucleus; (2) the fatty acids of an oil of the class consisting of drying and semi-drying oils in amount at least 20% based stoichiometrically on the total hydroxyl content of the oxyalkylated resin; and (3) a dicarboxy acid in amount not exceeding 70% based stoichiometrically on the total hydroxyl content of the oxyalkylated resin; with the proviso that at least 50% stoichiometrically of the total hydroxyl content of the oxyalkylated resin is esterified by a material of the class consisting of such fatty acids and dicarboxy acids, and the proviso that the dicarboxy acid contains only carbon, hydrogen and oxygen.

6. An esterification product of (1) an oxyalkylation product of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one carbonyl group reactive toward said phenol; said resin being formed in the substantial absence of phenols of functionality greater than two; said phenol being of the formula

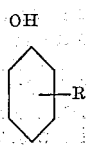

in which R is a hydrocarbon radical having at least 4 and not more than 18 carbon atoms and substituted in one of the positions, ortho and para; said oxyalkylated resin being characterized by the introduction into the resin molecule of the phenolic hydroxyl groups of a plurality of divalent radicals having the formula $R_1O$ in which $R_1$ is a member selected from the class consisting of ethylene radicals, propylene radicals, butylene radicals, hydroxypropylene radicals, and hydroxybutylene radicals, with the proviso that from about one-half to less than 2 moles of alkylene oxide be introduced for each phenolic nucleus; (2) the fatty acids of an oil of the class consisting of drying and semi-drying oils in amount at least 20% based stoichiometrically on the total hydroxyl content of the oxyalkylated resin; and (3) phthalic acid in amount not exceeding 70% based stoichiometrically on the total hydroxyl content of the oxyalkylated resin; with the proviso that at least 50% stoichiometrically of the total hydroxyl content of the oxyalkylated resin is esterified by a material of the class consisting of such fatty acids and phthalic acid.

7. An esterification product of (1) an oxyethylation product of (A) ethylene oxide, and (B) an oxyethylation-susceptible, fusible, organic solvent-soluble, low-stage, acid-catalyzed phenol-formaldehyde resin; said resin being derived by reaction between a difunctional monohydric phenol and formaldehyde; said resin being formed in the substantial absence of phenols of functionality greater than two; said phenol being of the formula

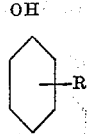

in which R is a hydrocarbon radical having at least 4 and not more than 18 carbon atoms and substituted in one of the positions, ortho and para; said oxyethylated resin being characterized by the introduction into the resin molecule at the phenolic hydroxyl groups of a plurality of divalent radicals having the formula $C_2H_4O$, with the proviso that from about one-half to less than 2 moles of ethylene oxide be introduced for each phenolic nucleus; and (2) the fatty acids of an oil of the class consisting of drying and semi-drying oils in amount at least 20% based stoichiometrically on the total hydroxyl content of the oxyethylated resin; with the proviso that at least 50% stoichiometrically of the total hydroxyl content of the oxyethylated resin is esterified by a material of the class consisting of such fatty acids and polycarboxy acids, with the proviso that the polycarboxy acid contains only oxygen, hydrogen and carbon and in amount does not exceed 70% based stoichiometrically on the total hydroxyl content of the oxyethylated resin.

8. An esterification product of (1) an oxyethylation product of (A) ethylene oxide and (B) an oxyethylation-susceptible, fusible, organic solvent-soluble, low-stage, acid-catalyzed phenol-formaldehyde resin; said resin being derived by reaction between a difunctional monohydric phenol and formaldehyde; said resin being formed in the substantial absence of phenols of functionality greater than two; said phenol being of the formula

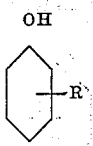

in which R is a hydrocarbon radical having at least 4 and not more than 18 carbon atoms and substituted in one of the positions, ortho and para; said oxyethylated resin being characterized by the introduction into the resin molecule at the phenolic hydroxyl groups of a plurality of divalent radicals having the formula $C_2H_4O$, with the proviso that from about one-half to less than 2 moles of ethylene oxide be introduced for each phenolic nucleus; (2) the fatty acids of an oil of the class consisting of drying and semi-drying oils in amount at least 20% based stoichiometrically on the total hydroxyl content of the oxyethylated resin; and (3) a dicarboxy acid in amount not exceeding 70% based stoichiometrically on the total hydroxyl content of the oxyethylated resin; with the proviso that at least 50% stoichiometrically of the total hydroxyl content of the oxyethylated resin is esterified by a material of the class consisting of such fatty acids and dicarboxy acids, and the proviso that the dicarboxy acid contains only carbon, hydrogen and oxygen.

9. An esterification product of (1) an oxyethylation product of (A) ethylene oxide and (B) an oxyethylation-susceptible, fusible, organic solvent-soluble, low-stage, acid-catalyzed phenol-formaldehyde resin; said resin being derived by reaction between a difunctional monohydric phenol and formaldehyde; said resin being formed in the substantial absence of phenols of functionality greater than two; said phenol being of the formula

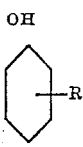

in which R is a hydrocarbon radical having at least 4 and not more than 18 carbon atoms and substituted in one of the positions, ortho and para; said oxyethylated resin being characterized by the introduction into the resin molecule at the phenolic hydroxyl groups of a plurality of divalent radicals having the formula C₂H₄O, with the proviso that from about one-half to less than 2 moles of ethylene oxide be introduced for each phenolic nucleus; (2) the fatty acids of an oil of the class consisting of drying and semi-drying oils in amount at least 20% based stoichiometrically on the total hydroxyl content of the oxyethylated resin; and (3) phthalic acid in amount not exceeding 70% based stoichiometrically on the total hydroxyl content of the oxyethylated resin; with the proviso that at least 50% stoichiometrically of the total hydroxyl content of the oxyethylated resin is esterified by a material of the class consisting of such fatty acids and phthalic acid.

10. An esterification product of (1) an oxyethylation product of (A) ethylene oxide and (B) an oxyethylation-susceptible, fusible, organic solvent-soluble, low-stage, acid-catalyzed phenol-formaldehyde resin; said resin being derived by reaction between a difunctional monohydric phenol and formaldehyde; said resin being formed in the substantial absence of phenols of functionality greater than two; said phenol being of the formula

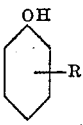

in which R is an aliphatic hydrocarbon radical having at least 4 and not more than 18 carbon atoms and substituted in the para position; said oxyethylated resin being characterized by the introduction into the resin molecule at the phenolic hydroxyl groups of a plurality of divalent radicals having the formula C₂H₄O, with the proviso that one mole of ethylene oxide be introduced for each phenolic nucleus; and (2) the fatty acids of an oil of the class consisting of drying and semi-drying oils in amount at least 20% based stoichiometrically on the total hydroxyl content of the oxyethylated resin; with the proviso that at least 50% stoichiometrically of the total hydroxyl content of the oxyethylated resin is esterified by a material of the class consisting of such fatty acids and polycarboxy acids, with the proviso that the polycarboxy acid contains only oxygen, hydrogen and carbon and in amount does not exceed 70% based stoichiometrically on the total hydroxyl content of the oxyethylated resin.

11. An esterification product of (1) an oxyethylation product of (A) ethylene oxide and (B) an oxyethylation-susceptible, fusible, organic solvent-soluble, low-stage, acid-catalyzed phenol-formaldehyde resin; said resin being derived by reaction between a difunctional monohydric phenol and formaldehyde; said resin being formed in the substantial absence of phenols of functionality greater than two; said phenol being of the formula

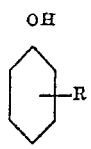

in which R is an aliphatic hydrocarbon radical having at least 4 and not more than 18 carbon atoms and substituted in the para position; said oxyethylated resin being characterized by the introduction into the resin molecule at the phenolic hydroxyl groups of a plurality of divalent radicals having the formula C₂H₄O, with the proviso that one mole of ethylene oxide be introduced for each phenolic nucleus; (2) the fatty acids of an oil of the class consisting of drying and semi-drying oils in amount at least 20% based stoichiometrically on the total hydroxyl content of the oxyethylated resin; and (3) a dicarboxy acid in amount not exceeding 70% based stoichiometrically on the total hydroxyl content of the oxyethylated resin; with the proviso that at least 50% stoichiometrically of the total hydroxyl content of the oxyethylated resin is esterified by a material of the class consisting of such fatty acids and dicarboxy acids, and the proviso that the dicarboxy acid contains only carbon, hydrogen and oxygen.

12. An esterification product of (1) an oxyethylation product of (A) ethylene oxide and (B) an oxyethylation-susceptible, fusible, organic solvent-soluble, low-stage, acid-catalyzed phenol-formaldehyde resin; said resin being derived by reaction between a difunctional monohydric phenol and formaldehyde; said resin being formed in the substantial absence of phenols of functionality greater than two; said phenol being of the formula

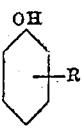

in which R is an aliphatic hydrocarbon radical having at least 4 and not more than 18 carbon atoms and substituted in the para position; said oxyethylated resin being characterized by the introduction into the resin molecule at the phenolic hydroxyl groups of a plurality of divalent radicals having the formula C₂H₄O, with the proviso that one mole of ethylene oxide be introduced for each phenolic nucleus; (2) the fatty acids of an oil of the class consisting of drying and semi-drying oils in amount at least 20% based stoichiometrically on the total hydroxyl content of the oxyethylated resin; and (3) phthalic acid in amount not exceeding 70% based stoichiometrically on the total hydroxyl content of the oxyethylated resin; with the proviso that at least 50% stoichiometrically of the total hydroxyl content of the oxyethylated resin is esterified by a material of the class consisting of such fatty acids and phthalic acid.

13. An esterification product of (1) an oxyethylation product of (A) ethylene oxide and (B) an oxyethylation-susceptible, fusible, organic solvent-soluble, low-stage, acid-catalyzed phenol-formaldehyde resin; said resin being derived by reaction between a difunctional monohydric phenol and formaldehyde; said resin being formed in the substantial absence of phenols of functionality greater than two; said phenol being of the formula

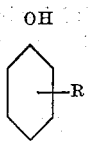

in which R is a butyl radical and substituted in the para position; said oxyethylated resin being characterized by the introduction into the resin molecule at the phenolic hydroxyl groups of a plurality of divalent radicals having the formula $C_2H_4O$, with the proviso that one mole of ethylene oxide be introduced for each phenolic nucleus; and (2) the fatty acids of an oil of the class consisting of drying and semi-drying oils in amount of at least 20% based stoichiometrically on the total hydroxyl content of the oxyethylated resin; with the proviso that at least 50% stoichiometrically of the total hydroxyl content of the oxyethylated resin is esterified by a material of the class consisting of such fatty acids and polycarboxy acids, with the proviso that the polycarboxy acid contains only oxygen, hydrogen and carbon and in amount does not exceed 70% based stoichiometrically on the total hydroxyl content of the oxyethylated resin.

14. An esterification product of (1) an oxyethylation product of (A) ethylene oxide and (B) an oxyethylation-susceptible, fusible, organic solvent-soluble, low-stage, acid-catalyzed phenol-formaldehyde resin; said resin being derived by reaction between a difunctional monohydric phenol and formaldehyde; said resin being formed in the substantial absence of phenols of functionality greater than two; said phenol being of the formula

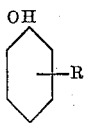

in which R is a butyl radical and substituted in the para position; said oxyethylated resin being characterized by the introduction into the resin molecule at the phenolic hydroxyl groups of a plurality of divalent radicals having the formula $C_2H_4O$, with the proviso that one mole of ethylene oxide be introduced for each phenolic nucleus; (2) the fatty acids of an oil of the class consisting of drying and semi-drying oils in amount at least 20% based stoichiometrically on the total hydroxyl content of the oxyethylated resin; and (3) a dicarboxy acid in amount not exceeding 70% based stoichiometrically on the total hydroxyl content of the oxyethylated resin; with the proviso that at least 50% stoichiometrically of the total hydroxyl content of the oxyethylated resin is esterified by a material of the class consisting of such fatty acids and dicarboxy acids, and the proviso that the dicarboxy acid contains only carbon, hydrogen and oxygen.

15. An esterification product of (1) an oxyethylation product of (A) ethylene oxide and (B) an oxyethylation-susceptible, fusible, organic solvent-soluble, low-stage, acid-catalyzed phenol-formaldehyde resin; said resin being derived by reaction between a difunctional monohydric phenol and formaldehyde; said resin being formed in the substantial absence of phenols of functionality greater than two; said phenol being of the formula

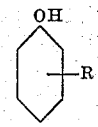

in which R is a butyl radical and substituted in the para position; said oxyethylated resin being characterized by the introduction into the resin molecule at the phenolic hydoxyl groups of a plurality of divalent radicals having the formula $C_2H_4O$, with the proviso that one mole of ethylene oxide be introduced for each phenolic nucleus; (2) the fatty acids of an oil of the class consisting of drying and semi-drying oils in amount at least 20% based stoichiometrically on the total hydroxyl content of the oxyethylated resin; and (3) phthalic acid in amount not exceeding 70% based stoichiometrically on the total hydroxyl content of the oxyethylated resin; with the proviso that at least 50% stoichiometrically of the total hydroxyl content of the oxyethylated resin is esterified by a material of the class consisting of such fatty acids and phthalic acid.

16. An esterification product of (1) an oxyethylation product of (A) ethylene oxide and (B) an oxyethylation-susceptible, fusible, organic solvent-soluble, low-stage, acid-catalyzed phenol-formaldehyde resin, said resin being derived by reaction between a difunctional monohydric phenol and formaldehyde; said resin being formed in the substantial absence of phenols of functionality greater than two; said phenol being of the formula

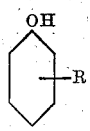

in which R is a butyl radical and substituted in the para position; said oxyethylated resin being characterized by the introduction into the resin molecule at the phenolic hydroxyl groups of a plurality of divalent radicals having the formula $C_2H_4O$, with the proviso that one mole of ethylene oxide be introduced for each phenolic nucleus; (2) the fatty acids of linseed oil, in amount at least 20% based stoichiometrically on the total hydroxyl content of the oxyethylated resin; and (3) phthalic acid in amount not exceeding 70% based stoichiometrically on the total hydroxyl content of the oxyethylated resin; with the proviso that at least 50% stoichiometrically of the total hydroxyl content of the oxyethylated resin is esterified by a material of the class consisting of such linseed oil fatty acids and phthalic acid.

17. An esterification product of (1) an oxyethylation product of (A) ethylene oxide and (B) an oxyethylation-susceptible, fusible, organic solvent-soluble, low-stage, acid-catalyzed phenol-formaldehyde resin, said resin being derived by reaction between a difunctional monohydric phenol and formaldehyde; said resin being formed in the substantial absence of phenols of functionality greater than two; said phenol being of the formula

in which R is a butyl radical and substituted in the para-position; said oxyethylated resin being characterized by the introduction into the resin molecule at the phenolic hydroxyl groups of a plurality of divalent radicals having the formula $C_2H_4O$, with the proviso that one mole of ethylene oxide be introduced for each phenolic nucleus; (2) the fatty acids of dehydrated castor oil, in amount at least 20% based stoichiometrically on the total hydroxyl content of the oxyethylated resin; and (3) phthalic acid in amount not exceeding 70% based stoichiometrically on the total hydroxyl content of the oxyethylated resin; with the proviso that at least 50% stoichometrically of the total hydroxyl content of the oxyethylated resin is esterified by a material of the class consisting of such dehydrated castor oil fatty acids and phthalic acid.

18. An esterification product of (1) an oxyethylation product of (A) ethylene oxide and (B) an oxyethylation-susceptible, fusible, organic solvent-soluble, low-stage, acid-catalyzed phenol-formaldehyde resin, said resin being derived by reaction between a difunctional monohydric phenol and formaldehyde; said resin being formed in the substantial absence of phenols of functionality greater than two; said phenol being of the formula

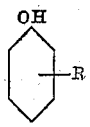

in which R is a butyl radical and substituted in the para position; said oxyethylated resin being characterized by the introduction into the resin molecule at the phenolic hydroxyl groups of a plurality of divalent radicals having the formula $C_2H_4O$, with the proviso that one mole of ethylene oxide be introduced for each phenolic nucleus; (2) the fatty acids of soybean oil, in amount at least 20% based stoichiometrically on the total hydroxyl content of the oxyethylated resin; and (3) phthalic acid in amount not exceeding 70% based stoichiometrically on the total hydroxyl content of the oxyethylated resin; with the proviso that at least 50% stoichiometrically of the total hydroxyl content of the oxyethylated resin is esterified by a material of the class consisting of such soybean oil fatty acids and phthalic acid.

19. A water insoluble esterification product of (1) the hydroxy ethyl ether of a phenol-formaldehyde resin, the phenol having the formula

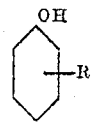

where R is a member of the group consisting of tert. butyl and tert. amyl in one of the positions ortho and para and wherein the hydroxy ethyl group is linked to the phenolic nuclei at the 1 position and there is one hydroxy ethyl group for each phenolic nucleus and (2) the fatty acids of an oil of the class consisting of drying and semi-drying oils with the proviso that at least 50% stoichiometrically of the total hydroxyl content of the hydroxyethylated resin is so esterified.

MELVIN DE GROOTE.
BERNHARD KEISER.

REFERENCES CITED

The following references are of record in the file of this patent:

UNITED STATES PATENTS

| Number | Name | Date |
|---|---|---|
| 2,169,991 | Rosenblum | Apr. 15, 1939 |
| 2,268,947 | Krumbhaar | Jan. 6, 1942 |
| 2,454,544 | Bock et al. | Nov. 23, 1948 |